United States Patent
Duclos et al.

(10) Patent No.: US 11,547,125 B2
(45) Date of Patent: Jan. 10, 2023

(54) PET FOOD FEEDING SYSTEM

(71) Applicant: Mars, Incorporated, McLean, VA (US)

(72) Inventors: Laura Duclos, Franklin, TN (US); Yuka Mitsuhashi, Franklin, TN (US)

(73) Assignee: Mars, Incorporated, McLean, VA (US)

( * ) Notice: Subject to any disclaimer, the term of this patent is extended or adjusted under 35 U.S.C. 154(b) by 194 days.

(21) Appl. No.: 15/545,990

(22) PCT Filed: Feb. 12, 2016

(86) PCT No.: PCT/US2016/017851
§ 371 (c)(1),
(2) Date: Jul. 24, 2017

(87) PCT Pub. No.: WO2016/130981
PCT Pub. Date: Aug. 18, 2016

(65) Prior Publication Data
US 2018/0000123 A1    Jan. 4, 2018

Related U.S. Application Data

(60) Provisional application No. 62/116,277, filed on Feb. 13, 2015.

(51) Int. Cl.
*A23K 50/40* (2016.01)
*A23K 20/147* (2016.01)
(Continued)

(52) U.S. Cl.
CPC ............ *A23K 20/147* (2016.05); *A23K 10/20* (2016.05); *A23K 10/30* (2016.05); *A23K 20/158* (2016.05);
(Continued)

(58) Field of Classification Search
CPC .. A23K 20/147; A23K 20/158; A23K 20/163; A23K 20/174; A23K 20/20;
(Continued)

(56) References Cited

U.S. PATENT DOCUMENTS 3,032,422 A    5/1962  Alikonis
3,615,675 A   10/1971  Wisdom et al.
(Continued)

FOREIGN PATENT DOCUMENTS

CA   2383715       11/2007
CN   1135850 A     11/1996
(Continued)

OTHER PUBLICATIONS

Bren, "Ped Food: The Lowdown on Labels", US Food and Drug Administration, FDA Consumer Magazine, May-Jun. 2001, 6 pgs.
(Continued)

*Primary Examiner* — W A Moore
(74) *Attorney, Agent, or Firm* — Baker Botts L.L.P.

(57) ABSTRACT

Compositions and methods are disclosed for providing a pet food feeding system or packaged product containing multiple formulations meeting a number of parameters in order to offer diversified ingredients and varied flavors to a pet with minimized digestive stress due to dietary changes.

6 Claims, 6 Drawing Sheets

(51) Int. Cl.
 *A23K 10/30*   (2016.01)
 *A23K 20/174*  (2016.01)
 *A23K 20/158*  (2016.01)
 *A23K 20/163*  (2016.01)
 *A23K 40/25*   (2016.01)
 *A23K 20/20*   (2016.01)
 *A23K 10/20*   (2016.01)
 *A23K 50/42*   (2016.01)

(52) U.S. Cl.
 CPC .......... *A23K 20/163* (2016.05); *A23K 20/174* (2016.05); *A23K 20/20* (2016.05); *A23K 40/25* (2016.05); *A23K 50/40* (2016.05); *A23K 50/42* (2016.05)

(58) Field of Classification Search
 CPC ........ A23K 40/25; A23K 50/40; A23K 50/42; A23K 10/20; A23K 10/30
 See application file for complete search history.

(56) References Cited

U.S. PATENT DOCUMENTS

| | | |
|---|---|---|
| 3,653,908 A | 4/1972 | Buck et al. |
| 3,764,715 A | 10/1973 | Henthorn |
| 3,882,257 A | 5/1975 | Cagle |
| 3,916,029 A | 10/1975 | Hildebolt |
| 3,922,353 A | 11/1975 | Bernotavicz |
| 4,006,266 A | 2/1977 | Bone |
| 4,032,665 A | 6/1977 | Miller et al. |
| 4,044,158 A | 8/1977 | Burkwall, Jr. |
| 4,145,447 A | 3/1979 | Fisher et al. |
| 4,190,679 A | 2/1980 | Coffee et al. |
| 4,260,635 A | 4/1981 | Fisher |
| 4,366,175 A | 12/1982 | Brown et al. |
| 4,596,714 A | 6/1986 | Brabbs |
| 4,656,191 A | 4/1987 | Fanelli |
| 4,689,238 A | 8/1987 | Hitchner |
| 4,735,808 A | 4/1988 | Gellman et al. |
| 4,777,058 A | 10/1988 | Chandler et al. |
| 4,822,626 A | 4/1989 | Spanier et al. |
| 4,828,846 A | 5/1989 | Rasco et al. |
| 4,857,333 A | 8/1989 | Harold |
| 4,883,672 A | 11/1989 | Shug et al. |
| 4,888,192 A | 12/1989 | Ramnarine |
| 4,892,748 A | 1/1990 | Andersen et al. |
| 4,900,572 A | 2/1990 | Repholz et al. |
| 4,954,061 A | 9/1990 | Repholz et al. |
| 5,000,940 A | 3/1991 | Staples et al. |
| 5,000,973 A | 3/1991 | Scaglione et al. |
| 5,017,389 A | 5/1991 | Green |
| 5,030,458 A | 7/1991 | Shug et al. |
| 5,051,270 A | 9/1991 | Ueda et al. |
| 5,085,883 A | 2/1992 | Garleb et al. |
| 5,087,623 A | 2/1992 | Boynton et al. |
| 5,104,677 A | 4/1992 | Behr et al. |
| 5,120,554 A | 6/1992 | Farnsworth |
| 5,175,156 A | 12/1992 | Boynton et al. |
| 5,182,130 A | 1/1993 | Haralampu et al. |
| 5,192,804 A | 3/1993 | Blum et al. |
| 5,198,239 A | 3/1993 | Beavers |
| 5,240,720 A | 8/1993 | Axelrod |
| 5,240,962 A | 8/1993 | Nakatsu et al. |
| 5,289,795 A | 3/1994 | Mohilef |
| 5,312,633 A | 5/1994 | Schwartz |
| 5,312,638 A | 5/1994 | Traitler |
| 5,324,351 A | 6/1994 | Oshlack et al. |
| 5,397,803 A | 3/1995 | Smith |
| 5,422,352 A | 6/1995 | Astrup |
| 5,431,927 A | 7/1995 | Hand et al. |
| 5,449,281 A | 9/1995 | Dupart |
| 5,456,933 A | 10/1995 | Lee |
| 5,476,069 A | 12/1995 | Axelrod |
| 5,501,857 A | 3/1996 | Zimmer |
| 5,501,868 A | 3/1996 | Collings et al. |
| 5,540,917 A | 7/1996 | Isler et al. |
| 5,573,306 A | 11/1996 | Galloway et al. |
| 5,576,306 A | 11/1996 | Dressman et al. |
| 5,585,366 A | 12/1996 | Gallaher et al. |
| 5,605,893 A | 2/1997 | Kaufman |
| 5,616,569 A | 4/1997 | Reinhart |
| 5,626,849 A | 5/1997 | Hastings et al. |
| 5,643,623 A | 7/1997 | Schmitz et al. |
| 5,654,028 A | 8/1997 | Christensen et al. |
| 5,656,312 A | 8/1997 | Erasmus et al. |
| 5,681,605 A | 10/1997 | Takemori |
| 5,684,045 A | 11/1997 | Smith |
| 5,695,797 A | 12/1997 | Geromini |
| 5,714,472 A | 2/1998 | Gray et al. |
| 5,730,988 A | 3/1998 | Womack |
| 5,750,170 A | 5/1998 | Daouse et al. |
| 5,776,887 A | 7/1998 | Lee et al. |
| 5,780,039 A | 7/1998 | Greenberg et al. |
| 5,827,565 A | 10/1998 | Axelrod |
| 5,846,581 A | 12/1998 | Catron |
| 5,869,528 A | 2/1999 | Cavazza |
| 5,887,749 A | 3/1999 | Schommer et al. |
| 5,894,029 A | 4/1999 | Brown et al. |
| 5,895,652 A | 4/1999 | Giampapa |
| 5,897,893 A | 4/1999 | Mohilef |
| 5,916,622 A | 6/1999 | Ecochard |
| 5,922,379 A | 7/1999 | Wang et al. |
| 5,925,390 A | 7/1999 | Kornacki |
| 5,932,258 A | 8/1999 | Sunvold |
| 5,965,175 A | 10/1999 | Reinhart et al. |
| 5,968,569 A | 10/1999 | Cavadini |
| 6,001,400 A | 12/1999 | Burger |
| 6,039,952 A | 3/2000 | Sunvold et al. |
| 6,042,873 A | 3/2000 | Lawson |
| 6,071,544 A | 6/2000 | Sunvold |
| 6,080,403 A | 6/2000 | Shields et al. |
| 6,086,940 A | 7/2000 | Axelrod |
| 6,093,427 A | 7/2000 | Axelrod |
| 6,117,477 A | 9/2000 | Paluch et al. |
| 6,133,323 A | 10/2000 | Hayek |
| 6,156,355 A | 12/2000 | Shields et al. |
| 6,180,131 B1 | 1/2001 | Sunvold et al. |
| 6,197,361 B1 | 3/2001 | Anantharaman et al. |
| 6,203,825 B1 | 3/2001 | Hodgkins |
| 6,238,708 B1 | 5/2001 | Hayek et al. |
| 6,254,910 B1 | 7/2001 | Paluch |
| 6,310,090 B1 | 10/2001 | Hayek |
| 6,329,361 B1 | 12/2001 | McCarty |
| 6,355,612 B1 | 3/2002 | Ballevre et al. |
| 6,383,529 B2 | 5/2002 | Davenport et al. |
| 6,410,063 B1 | 6/2002 | Jewell et al. |
| 6,455,083 B1 | 9/2002 | Wang |
| 6,458,378 B1 | 10/2002 | Sunvold |
| 6,517,877 B2 | 2/2003 | Gannon |
| 6,576,270 B2 | 6/2003 | Leko |
| 6,576,280 B2 | 6/2003 | Bebiak et al. |
| 6,630,159 B2 | 10/2003 | Sunvold |
| 6,669,975 B1 | 12/2003 | Abene et al. |
| 6,672,252 B2 | 1/2004 | Levin |
| 6,733,263 B2 | 5/2004 | Pope |
| 6,827,957 B2 | 12/2004 | Paluch et al. |
| 6,841,178 B2 | 1/2005 | Cupp et al. |
| 6,896,924 B2 | 5/2005 | Hernandez et al. |
| 6,904,870 B2 | 6/2005 | Russell-Maynard et al. |
| 6,957,914 B2 | 10/2005 | Arends et al. |
| 6,977,084 B2 | 12/2005 | Bui et al. |
| 7,001,618 B1 | 2/2006 | Sunvold et al. |
| 7,120,588 B2 | 10/2006 | Versch |
| 7,125,574 B2 | 10/2006 | Cupp et al. |
| 7,449,204 B2 | 11/2008 | Stookey |
| 7,485,330 B2 | 2/2009 | Anderson et al. |
| 7,731,996 B2 | 6/2010 | Bruce et al. |
| 8,091,509 B2 | 1/2012 | Perez-Camargo et al. |
| 8,252,742 B2 | 8/2012 | Friesen et al. |
| 8,691,792 B2 | 4/2014 | Xu et al. |
| 2001/0048955 A1 | 12/2001 | Foreman et al. |
| 2002/0044990 A1 | 4/2002 | De Simone |
| 2002/0119241 A1 | 8/2002 | Speck et al. |
| 2002/0150650 A1 | 10/2002 | Cupp |

(56) References Cited

U.S. PATENT DOCUMENTS

| | | |
|---|---|---|
| 2002/0172752 A1 | 11/2002 | Chizmas |
| 2003/0026875 A1 | 2/2003 | Aguilar et al. |
| 2003/0026876 A1 | 2/2003 | Albuja et al. |
| 2003/0194423 A1 | 10/2003 | Torney et al. |
| 2004/0005392 A1 | 1/2004 | Filipi et al. |
| 2004/0022828 A1 | 2/2004 | Sunvold |
| 2004/0091572 A1 | 5/2004 | Bruce et al. |
| 2004/0161495 A1 | 8/2004 | Sergheraert et al. |
| 2004/0175389 A1 | 9/2004 | Porubcan |
| 2004/0197462 A1 | 10/2004 | Hall |
| 2004/0244068 A1 | 12/2004 | Heaton et al. |
| 2004/0253342 A1 | 12/2004 | Townsend et al. |
| 2005/0100559 A1 | 5/2005 | Myatt et al. |
| 2005/0181097 A1 | 8/2005 | Townsend et al. |
| 2005/0276882 A1 | 12/2005 | Bishop |
| 2006/0188611 A1* | 8/2006 | Unlu ............... A23K 40/25 426/89 |
| 2006/0204637 A1* | 9/2006 | Hall ................. A61P 3/00 426/620 |
| 2006/0228448 A1* | 10/2006 | Boileau ............ A23K 20/158 426/61 |
| 2008/0038403 A1 | 2/2008 | Bierer et al. |
| 2008/0089984 A1 | 4/2008 | Bruce et al. |
| 2010/0303978 A1 | 12/2010 | Sunvold et al. |
| 2011/0052752 A1 | 3/2011 | Saxe et al. |
| 2013/0059028 A1 | 3/2013 | Foy et al. |
| 2013/0281533 A1* | 10/2013 | Yamka ............. A23K 20/179 514/558 |
| 2014/0141134 A1 | 5/2014 | Johnson et al. |
| 2014/0161962 A1* | 6/2014 | Boebel ............. A23K 40/00 426/656 |
| 2015/0010669 A1* | 1/2015 | Kimura ............ A23K 50/48 426/2 |
| 2018/0295862 A1 | 10/2018 | Mao et al. |
| 2018/0368446 A1 | 12/2018 | Allaway et al. |
| 2021/0186055 A1 | 6/2021 | Allaway et al. |

FOREIGN PATENT DOCUMENTS

| | | |
|---|---|---|
| CN | 101155518 A | 4/2008 |
| CN | 101627824 A | 1/2010 |
| CN | 102573857 A | 7/2012 |
| CN | 101795577 B | 12/2013 |
| DE | 2947503 A1 | 5/1981 |
| DE | 3417196 | 11/1985 |
| DE | 3904109 A1 | 8/1989 |
| DE | 29711410 | 9/1997 |
| EP | 0071331 | 2/1983 |
| EP | 0225774 | 6/1987 |
| EP | 0140691 | 8/1988 |
| EP | 0558774 | 9/1993 |
| EP | 0769252 | 4/1997 |
| EP | 0850569 A1 | 7/1998 |
| EP | 0769914 | 5/2003 |
| EP | 1344458 A1 | 9/2003 |
| EP | 1269857 A3 | 5/2004 |
| EP | 2875736 A1 | 5/2015 |
| FR | 2735331 | 12/1996 |
| GB | 2194125 | 3/1988 |
| GB | 2309370 A | 7/1997 |
| JP | S62296847 | 12/1987 |
| JP | H0463560 U | 2/1992 |
| JP | H1014501 | 1/1998 |
| JP | 11266795 | 10/1999 |
| JP | 2002238464 | 8/2002 |
| JP | 2005508647 | 4/2005 |
| JP | 2013516188 A | 5/2013 |
| JP | 2015156846 A | 9/2015 |
| NL | 7507482 | 12/1976 |
| RU | 2420210 C2 | 6/2011 |
| WO | 9603150 A1 | 2/1996 |
| WO | 9835014 | 8/1998 |
| WO | 0042168 | 7/2000 |
| WO | 0051443 B1 | 11/2000 |
| WO | 0117365 | 3/2001 |
| WO | 0190311 A1 | 11/2001 |
| WO | 02094296 | 11/2002 |
| WO | 03053159 A1 | 7/2003 |
| WO | 03070019 A1 | 8/2003 |
| WO | 03075676 A1 | 9/2003 |
| WO | 03105596 | 12/2003 |
| WO | 2012047800 A1 | 4/2012 |
| WO | 2014092716 A1 | 6/2014 |
| WO | 2014098193 A1 | 6/2014 |
| WO | 2015048339 A2 | 4/2015 |
| WO | 2016130981 | 8/2016 |

OTHER PUBLICATIONS

Brown, "Digestibility of Pet Foods", Can. Vet. J., 1987, 314-315.
De Godoy, et al., "Alternative Dietary Fiber Sources in Companion Animal Nutrition", Nutrients, vol. 5, No. 8, (Aug. 6, 2013), XP055277289, 3099-3117.
Duclos, "The Benefits of Rotation Feeding", http://urbanpawsmagazine.com/archives/59, 2008, 5 pgs.
Fallis, "Switching Dog Food Gradually—Guidelines for Success", http://www.petful.com/food/switching-dog-food-gradually/, Oct. 15, 2012, 3 pgs.
Foster, et al., "Dog Foods, How to Switch", www.drsforstersmith.com/pic/article.cfm?aid=99, retrieved from the Internet on Nov. 27, 2015, 3 pgs.
Nyman, "Dietary Fiber Content and Composition in Six Cereals at Different Extraction Rates", Cereal Chemistry, vol. 61, No. 1, (Jan. 1, 1984), XP055218753, 14-19.
Howell, et al., "Prevention of Trichobezoar in the Cotton Rat, Sigmodon hispidus hispidus", Science, vol. 107, 1948, pp. 424-425.
Ben, "Effect of L-Carnitine in Racing Sled Dogs", Wien., Tieraerztl. Monatsschr., 1998, 85(10), Abstract, 2 pages.
Jacobs, "Treating Cardiomyopathy in Dogs and Cats", Veterinary Medicine, vol. 91, No. 6, Jun. 1996, pp. 544-564.
Jones, et al., "Cutaneous Xanthomata Associated with Diabetes Mellitus in a Cat", Journal of Small Animal Practice, vol. 26, Jan. 1985, abstract only, 1 pg.
Kealy, et al., "Effects of Diet Restriction on Life Span and Age-Related Changes in Dogs", JAVMA, vol. 220, No. 9, May 1, 2002, 1315, 1317-1320.
Keene, "L-Carnitine Supplement in the Therapy of Canine Dilated Cardiomyopathy", Vet. Clin. North Am. Small Anim. Pract., vol. 21, No. 6, Sep. 1991, Abstract, 1 page.
Kittleson, et al., "Results of the Multicenter Spaniel Trial (MUST): Taurine- and Carnitine-Responsive Dilated Cardiomyopathy in American Cocker Spaniels with Decreased Plasma Taurine ConcenliaLion", Journal of Veterinary Internal Medicine, vol. 11, No. 4, Jul.-Aug. 1997, pp. 204-211.
Koyama, et al., "Tissue Triglycerides, Insulin Resistance and Insulin Production; Implications for Hyperinsulinemia of Obesity", Am. J. Physiol., Oct. 1997,E708-E712.
Lane, et al., "Calorie Restriction in Nonhuman Primates: Implications for Age-Related Disease Risk", Journal of Anti-Aging Medicine, vol. 1, No. 4, pp. 315-326, Dec. 1998.
Lawton, et al., "Viscoelasticity of Zein-Starch Doughs", Cereal Chemistry, 69(4): 351-355, Feb. 1992.
Legro, et al., "A Fasting Glucose to Insulin Ratio is a Useful Measure of Insulin Sensitivity in Women with Polycystic Ovary Syndrome", J. Clin. Endocrinol. Metab., Aug. 1998, 83(8), pp. 2694-2698.
Lester, et al., "Macronutrient Utilization in Cats Fed Low and High Fat Diets", FASEB Journal, vol. 11, No. 3, Nov. 1997, p. A372, Abstract 2156.
Liang, et al., "Effect of Pressure, Moisture, and Cooking Time on Susceptibility of Corn or Sorghum Grain Starch to Enzyme Attack", Journal of Dairy Sciences, vol. 53, No. 3, Jan.-Dec. 1970, pp. 336-341.
Ludwig, "Dietary Glycemic Index and Obesity", American Society for Nutritional Sciences, pp. 280S-283S, Feb. 2000.

(56) References Cited

OTHER PUBLICATIONS

Mahdi, et al., "The therapeutic value of barley in the treatment of diabetes mellitus", Proceedings of the Nutrition Society, vol. 47, No. 3,1988, GB, pp. 178A.

Martin, et al., "Recommandations Nutritionnelles Dans Le Traitement Des Principales Affections du Chat", Point Veterinaire, Editions du Point Veterinaire, Maisons-Alfort, FR, vol. 28, No. 178, Aug. 1996, pp. 327-337.

McEntee, et al., "Clinical Electrocardiographic and echocardiographic Improvements after L-carnitine Supplementation in a Cardiomyopathic Labrador", Canine Practice, vol. 20., No. 2, Mar./Apr. 1995, pp. 12-15.

McMillin, et al., "Inflence of Dietary Fish Oil on Mitochondrial Function and Response to Ischemia", American Journal of Physiology, Nov. 1992, 263, Abstract, 2 pages.

Meyer, et al., "Gewichtsentwicklung und Korperzusammensetzung wachsender Hunde bei Fütterung isoenergetischer fett- Oder kohlenhydratreicher Rationen", Deutsche Tierärztliche Wochenschrift, vol. 86, No. 6, 1979, DE, pp. 215-220.

O'Donnell, et al., "Aqueous Pseudolatex of Zein for Film Coating of Solid Dosage Forms", European Journal of Pharmaceutics and Biopharmaceutics, 43(1):83-89, Jan. 1997.

Owen, et al., "Effect of L-Carnitine and Soybean Oil on Growth Performance and Body Composition of Early-Weaned Pigs", J. Anim Sci. 74, Issue 7, Jul. 1996, pp. 1612-1619.

Peterson, "Don't Let Your Senior Cat Become a Skinny Old Kitty", URL: http://feline-nutrition.org/nutrition/dont-let-your-senior-cat-become-a-skinny-old-kitty, Sep. 19, 2015, 6 pgs.

Ramsey, et al., "Dietary Restriction and Aging in Rhesus Monkeys: The University of Wisconsin Study", Experimenta Gerontology, 35 (Jun. 2000) 1131-1149.

Reaven, et al., "Effect of Age and Diet on Insulin Secretion and Insulin Action in the Rat", Diabetes, Feb. 1983, 32(2); 175-180, Abstract only, 3 pages.

Rice, "The Dog Handbook", pp. 48-49, published by Barron's Educational Series, Oct. 1, 1999.

Roberts, "High-glycemic Index Foods, Hunger and Obesity: Is There a Connection?", Nutrition Reviews, vol. 58, No. 6, pp. 163-169, Jun. 2000.

Romsos, et al., "Effects of Dietary Carbohydrate, Fat and Protein on Growth, Body Composition and Blood Metabolite Levels in the Dog", J. Nutr., 106, Oct. 1976, pp. 1452-1464 (Abstract Only).

Romsos, et al., "Regulation of protein intake in adult dogs", JAVMA, vol. 182(1), pp. 41-43, Jan. 1983.

Serpell, "The Domestic Dog", published by Cambridge University Press, pp. 104-106, Sep. 1995.

Sheffield-Moore, et al., "Isotopic decay of urinary or plasma 3-methylhistidine as a potential biomarker of pathologic skeletal muscle loss", Journal of Cachexia Sarcopenia Muscle, (Mar. 2014) 5:19-25.

St. Jeor, et al., "Dietary Protein and Weight Reduction: A Statement for Healthcare Professionals from the Nutrition Committee of the Council on Nutrition, Physical Activity and Metabolism of the American Heart Association", Circulation. Oct. 2001;104:1869-1874.

Sugawara, et al., "Measurement of the Rate of Myofibrillar Protein Degradation Using the Arteriovenous Difference inPlasma 3-Methylhistidine Concentration of Rats", J. Nutr. Sci. Vitaminol., 55:381-384, Aug. 2009.

Sunvold, et al., "Dietary Fiber for cats: in vitro Fermentation of Selected Fiber Sources by Cat Fecal Inoculum and in vivo Utilization of Diets Containing Selected Fiber Sources and their Blends", Journal of Animal Science, Aug. 1995, 73:2329-2339.

Sunvold, et al., "Dietary Fiber for Dogs: IV. In Vitro Fermentation of Selected Fiber Sources by Dog Fecal Inoculum and In Vivo Digestion and Metabolism of Fiber-Supplemented Diets", J. Anim. Sci., vol. 73, Article Acceptance: Dec. 7, 1994, 1099-1109.

Sunvold, et al., "Effect of dietary carnitine during energy restriction in the canine", FASEB Journal, vol. 13, No. 4, Part 1, Apr. 1999, p. A268.

Swern, Bailey's Industrial Oil and Fat Products, John Wiley & Sons, NY, "No Month", 1979, pp. 144-146, vol. 1, 4th edition.

Thorne, "Feeding Behavior of Cats", Cat World (May 1992), 171:20-21.

Wichert, et al., "Influence of Different Cellulose Types on Feces Quality of Dogs", American Society for Nutritional Sciences, J. Nutr., vol. 132, Issue 6, Jun. 1, 2002, pp. 1728S-1729S.

Wills, "Adult Maintenance", BSAVA Manual of Companion Animal Nutrition & Feeding, Chapter 3, British Small Animal Veterinary Association, Shurdington, Cheltenham, UK, Apr. 19, 1996, pp. 44-46.

Wills, et al., "Basic Principles of Nutrition and Feeding", BSAVA Manual of Companion Animal Nutrition and Feeding, Apr. 19, 1996, British Small Animal Veterinary Association, Shurdington, Cheltenham, UK, Chapter 1, pp. 10-21.

Youngren, et al., "Impaired Insulin-Receptor Autophophorylationis an early Defect in Fat-Fed, Insulin-Resistant Rats", J. Appl. Physiol., 91:2240-2247, Nov. 2001.

AOCS Official Method CD 12B-92. "Oil Stability Index", 1997, pp. 1-5.

AOCS Official Method CD 8b-90. "Peroxide Value Acetic Acid-Isooctane Method", 1997, 2 pages.

Decision to Refuse a European Patent Application, Application No. 03 756 266.7-2114, dated Aug. 4, 2011, 9 pages.

Hill's—The Global Leader in Pet Nutrition; Canine t/d Small Bites; for the Nutritional Management of Dogs with Dental Disease; www.hillspet.com website Jan. 14, 2005, 2 pages.

Hill's—The Global Leader in Pet Nutrition; Canine t/d; for the Nutritional Management of Dogs with Dental Disease; www.hillspet.com website Jan. 14, 2005, 3 pages.

Milk-Bone; Treats made for the dog in your life; www.milkbone.com website; Jan. 25, 2005, 1 page.

Pedigree; Pedigree Dentabone for Large Dogs; Snacks & Treats Nutrition for Adult Dogs; www.pedigree.com website Jan. 25, 2005, 1 page.

Pedigree; Pedigree Jumbone for Large Dogs; Snacks & Treats Nutrition for Adult Dogs; www.pedigree.com website Jan. 25, 2005, 1 page.

Promotional Material regarding the Macronutrient Profile of the Optimum Brand, Mars Petcare, The Waltham Centre for Pet Nutrition, Waltham on the Wolds, GB, Dec. 20, 2006, 16 pgs.

Purina Busy Bone; Beef Flavor Dog Treat for Large dogs; www.purina.com/BusyBone/large.com website; Aug. 26, 2016, 1 page.

Purina Busy Bone; Beef Flavor Dog Treat for small/medium dogs; www.purina.com/BusyBone/small.com website; Jan. 25, 2005, 2 pages.

Purina Dogwiches TM brand Dog Snack; www.purina.com/Dogwiches/mini.asp website; Jan. 25, 2005, 1 page.

Purina Tux, Tux Senior, www.Nestle.co.nz/tux; Internet Wayback Machine, Dec. 21, 2004, 1 page.

Purina Tux; Tux Adult; www.Nestle.co.nz/tux; , Internet Wayback Machine Dec. 21, 2004, 1 page.

Purina Tux; Tux Country; www.Nestle.co.nz/tux; Internet wayback machine Apr. 18, 2005, 1 page.

Purina Tux; Tux Energy Beef & Liver Flavor (Ltd. Ed.); www.Nestle.co.nz/tux; Internet Wayback Machine, Apr. 18, 2005, 1 page.

R/d Feline Product Specification Page, Hills Pet Nutrition Inc., Apr. 15, 2008, 2 pgs.

The Waltham Book of Dog and Cat Behavior, Ed., C. Thorne, Pergamon Press, PLC, Oxford England, p. 118, 1992.

Think Treats; New Chew Lotta; www.meatybone.com/pages/dogtreats/meatybone/chewlotta.asp website, Jan. 25, 2005, 1 page.

"Food Energy Definition", Oct. 28, 2008, 4 pgs.

"Nutrient Requirements for Cats", National Academy Press, 1986, pp. 3-9, 37-38, 41-44.

"Nutrient Requirements for Dogs", National Academy Press, Mar. 1, 1985, pp. 2-5, 7-9, 12-14, 44-45.

"Optimal Nutrition for Exercise and Good Health", Health 410, 2000, online, Chapter 10, 22 pages, downloaded Aug. 23, 2006.

"Purina CNM Veterinary Product Guide", 2014, 95 pgs.

Alavi, et al., "Rheological Characteristics of Intermediate Moisture Blends of Pregelatinized and Raw Wheat Starch", J. Agric. Food Chem., vol. 50, pp. 6740-6745, Oct. 2002.

(56) References Cited

OTHER PUBLICATIONS

Andres, "Natural Edible Coating has Excellent Moisture and Grease Barrier Properties", Database FSTA (online), Food Processing USA, 45(13):48, Dec. 1984 (abstract 1 pg.).
Anon, "Scientific Opinion on the Safety and Efficacy of the Use of Amino Acids (chemical group 34) when used as Flavourings for all Animal Species", The EFSA Journal, vol. 12, No. 5:3670. 10 pages, May 1, 2014.
Baba, et al., "High Protein vs. High Carbohydrate Hypoenergetic Diet for the Treatment of Obese Hyperinsulinemic Subjects", Int. J. Obes. Relat. Metab. Disord., Nov. 1999, 23(11), Abstract only, 2 pp.
Beauchamp, et al., "Flavor Preferences in Cats (*Felis catus* and *Panthera* sp.)", Journal of Comparative and Physiological Psychology Apr. 1977, vol. 91, No. 5, 1118-1127.
Bradshaw, "Food Selection by the Domestic Cat, an Obligate Carnivore", Compl. Biochem. Physiol., 114A, 3:205-209, Jul. 1996.
Bradshaw, "Sensory and Experimental factors in the Design of Foods for Domestic Dogs and Cats", Proceedings of the Nutrition Society (Mar. 1991) 50, 99-106.
Burger, "Feeding", Catlopaedia, 49-91, Howell Book House, New York, NY, US, 1997.
Butchi Lakshmi, et al., "Hypoglycemic Effect of Selected Sorghum Recipes", Nutrition Research, 16(10), Jan. 1996, pp. 1651-1658.
Costa, et al., "Case Report: Efficacy of Oral Carnitine Therapy for Dilated Cardiomyopathy in Boxer Dogs", Journal of Nutrition, vol. 124, No. 12, Suppl., Jan. 1994, pp. 2687S-2692S.
Deng, "Effects of Dietary Macronutrient Profile and Feeding Frequency on Circulating Metabolites, Postprandial Endocrine Response, and Voluntary Physical Activity of Healthy Adult Cats", Doctoral Dissertation, 2013, 169 pgs.
Diez, et al., "Fibres alimentaires chez le chien: I. Definition et composition chimique", Annales De Medecine Veterinaire, vol. 140, No. 6, 1996, 385-391.
Diez, et al., "Influence of a Blend of Fructo-Oligosaccharides and Sugar Beet Fiber on Nutrient Digestability and Plasma Metabolite Concentrations in Healthy Beagles", American Journal of Veterinary Research, vol. 58, No. 11, Nov. 1997, pp. 1238-1242.
Diez, et al., "The influence of sugar-beet fibre, guar gum and inulin on nutrient digestibility, water consumption and plasma metabolites in healthy Beagle dogs", Research in Veterinary Science, vol. 64, Issue 2, Mar.-Apr. 1998, ages 91-96.
Facchini, et al., "Insulin Resistance as a Predictor of Age-Related Diseases", The Journal of Clinical Endocrinology & Metabolism, Aug. 2001, 86(8): 3574-3578.
Foster-Powell, et al., "International Table of Glycemic Index and Glycemic Load Values", Am. J. Clin. Nutr., vol. 75 pp. 5-56, Jul. 2002.
Freeman, et al., "Interventional nutrition for cardiac disease", Seminars in Veterinary Medicine and Surgery (Small Animal), vol. 13, No. 4, Nov. 1998, Abstract, 1 page.
Goodwin, et al., "The Role of Dietary Modifications and Nondrug Therapy in Dogs and Cats with Congestive Heart Failure", Veterinary Medicine, 93(10), Oct. 1998, pp. 919-926.
Gorrel, "The Role of a Dental Hygiene Chew in Maintaining Periodontal Health in Dogs", J. Vet. Dent., Mar. 1, 1996, 13(1), pp. 31-34.
Grandjean, et al., "Dietary supplementation with L-carnitine, vitamin C and vitamin B12 in sport dogs. Experimental study in sled dogs", Recueil de Medecine Veterinaire, vol. 169, No. 7, 1993, Abstract, 2 pages.
Grandjean, et al., "Ergogenic Nutritional Supplementation in Efforts of Sporting Dogs", Recl. Med. Vet. Ec. Alfort, vol. 167, No. 7-8, Nov. 1991, Abstract, 2 pages.
Grandjean, et al., "Physiopathological Interests of L-Carnitine in Dog", Recueil d Medecine Veterinaire, 173(4-6), Apr. 1997, pp. 95-106.
Gross, et al., "Effect of dietary carnitine or chromium on weight loss and body composition of obese dogs", Journal of Dairy Science, vol. 81, No. Suppl. 1, Jan. 1998, 1 page.
Gross, et al., "Relationship of plasma carnitine levels in dogs and pigs fed supplemental dietary L-carnitine", Journal of Dairy Science, vol. 81, No. Suppl. 1, Jan. 1998, 1 page.
Gwathmey, et al., "Pathophysiology of cardiomyopathies: Part II. Drug-induced and other interventions", Current Opinion in Cardiology, vol. 9, No. 3, May 1994, pp. 369-378.
Hamlin, "Nutrition and the Heart", Vet. Clink. North Am. Small Anim. Pract., vol. 19, No. 3, May 1989, Abstract, 1 page.
Tomomatsu, "Health Effects of Oligosaccharides", Food Technology, 48, pp. 61-65, Oct. 1994.
Vickers et al., "Comparison of Fermentation of Selected Fructooligosaccharides and Other Fiber Substrates by Canine Colonic Microflora", AJVR, vol. 62, No. 4, Apr. 2001, pp. 609-615.
Willard et al., "Effects of Dietary Supplementation of Fructo-oligosaccharides on Small Intestinal Bacterial Overgrowth In Dogs", Am. J. Vet Res., vol. 55, No. 5, May 1994, pp. 654-659.
Carvalho et al., "Protective Effect of sorbitol and monosodium glutamate during storage of freeze-dried lactic acid bacteria", Lait, vol. 83, Original Article, Jan. 2003, 203-210, EDP Sciences, PT.
Distinct, Definition of Distinct, Merriam Websters Collegiate Dictionary, 1993, pp. 338-339, 10th Ed., Merriam-Webster, Inc.
USDA, Carrots, Raw, USDA National Nutrient Database for Standard Reference, May 9, 2013, 7 pages, Release 26.
USDA, Chicory Roots, Raw, USDA National Nutrient Database for Standard Reference, May 9, 2013, 2 pages, Release 26.
Vuyo Bhongolethu Mavumengwana, "Isolation, Purification and Characterization of Inulin and Fructooligosaccharides from Chicorium Intybus and Inulinase from Aspergillus Niger", Masters of Science Thesis, Jun. 2004, 127 pages, NA, Dept. of Biochemistry, Rhodes University, ZA.
Fructose, Fructose-Wikipedia, Sep. 9, 2013, 10 pgs, NA, Wikipedia, en.wikipedia.org/wiki/Fructose.
Maltose, Maltose-Wikipedia, Sep. 9, 2013, 4 pages, NA, Wikipedia, de.wikipedia.org/wiki/Maltose.
Friskies Vitality + Mini Menu Dog Food, www.gnpd.com, Composition of Friskies Vitality + Mini Menu Dog Food, Apr. 2003, 2 pages, NA, Mintel.
Younes et al., "Fermentable Fibers or Oligosaccharides Reduce Urinary Nitrogen Excretion byIncreasing Urea Disposal in the Rat Cecum," The Journal of Nutrition, vol. 125, Issue 4, Apr. 1995, 1010-1016 (Abstract Only—3 pgs.).
Anonymous, Royal Canin Sterilized +7 Cat, www.zooplus.co.uk, Mar. 19, 2015, available from https://web.archive.org/web/20150319105235/http:/www.zooplus.co.uk/shop/cats/dry_cat_food/royal_canin/royalcanin_health_nutrition/232447, 2 pages.

* cited by examiner

PET FOOD FEEDING SYSTEM

CROSS-REFERENCE TO RELATED APPLICATIONS

This application is a national stage application, filed under 35 U.S.C. § 371, of International Patent Application No. PCT/US2016/017851, filed Feb. 12, 2016, which claims priority from U.S. Provisional Application No. 62/116,277, filed Feb. 13, 2015, all of which are incorporated by reference herein in their entirety.

FIELD OF INVENTION

The present invention relates to a method and a dietary system comprising two or more formulations with diversified ingredients and subsequent varied flavor profiles wherein the formulations can be switched freely to and from any formulation in the system without upsetting the pet's digestive system.

BACKGROUND

To avoid upsetting the pet's digestive system, pet owners tend to stick with one particular type of food, whether it is a formulation, a brand, or a format (wet, dry, raw, etc.). Pet owners are reluctant to try, or are even advised against trying, other formulations, even if made by the same brand, which may contain different kinds of ingredients for fear of possible digestive problems caused by dietary change. A single formula diet has a limited number of ingredients and flavors or flavor profiles, which may affect the long term palatability and enjoyment of the food for the pet. If a food is not palatable to the pet, or it becomes unpalatable over time due to boredom with the food or flavor, nutritional deficiencies can occur as the amount of food consumed by the pet is less than the amount necessary to provide all of the nutritional requirements. Rotational pet food formulas currently available for sale in the market, focus on changing one or two or three main protein or carbohydrate supplying ingredients (typically less than 35% of the formula weight) and do not introduce a large percentage of ingredient diversity. Limiting ingredient diversity among rotational formulation is one way to reduce the potential for digestive upset compared with providing high ingredient diversity among rotational formulations which tends to have a higher potential for digestive upset. Therefore, those rotational pet food formulas, currently in market with limited ingredient diversity, do not provide a solution to offer pets a high degree of diversified ingredients variable both in the number and the formula weight percentage of ingredients while concomitantly avoiding digestive stresses that would result from diet change of diverse formulations as frequent as every meal, every day or every other day. The typical digestive problems in pets associated with diet changes may include vomiting, diarrhea, loose stool, constipation, flatulence, or any combination thereof.

Diet plays an important role in pets' general health and in preventing development of nutrition-related diseases. Therefore, it is important to develop a better method and a better dietary system that enables a pet owner to provide basic nutrition or to improve the diet and psychological well-being and maintain a pet's general health by feeding different formulations having diversified ingredients, mouth-feel textures, and varied flavors, and to conveniently switch between any number of these different formulations at a rate of choice with minimized concern of causing digestive problems to the animal.

SUMMARY OF INVENTION

The present application overcomes problems inherent in the prior art and provides a pet food feeding system, a packaged pet food product, a pet feeding supplement, and methods of feeding pets foods having diversified ingredients and flavors, without the attendant digestive problems experienced in the prior art or assumed to be present when switching diets with diversified ingredients.

One aspect of the present application provides a pet food feeding system that comprises two or more formulations, each of which contains between about 25 wt % (of the total weight of the formulation; same below and throughout the application) and about 50 wt % protein supplying ingredients, between about 45 wt % and about 70 wt % carbohydrate supplying ingredients, between about 1.5 wt % and about 12 wt % of fats and oils, up to about 6 wt % of other additives, and between about 4 wt % and about 12 wt % of total dietary fiber, preferably including between about 1 wt % and 2.5 wt % of total fermentable fiber, wherein each formulation in the system preferably has a consistent ratio of total dietary fiber: total fermentable fiber (TDF:TFF) between about 1.6:1 and about 12:1. In some forms of the disclosure, between 40 wt % and 95 wt % of each formulation in the system are unique ingredients (excluding additives such as vitamins and minerals) when compared with any other formulation comprised in the system. In other forms, at least 40, 45, 50, 55, 60, 65, 70, 75, 80, 85, 90, 95 or even 94.5 wt % of each formulation in the system are unique ingredients (excluding additives such as vitamins and minerals) when compared with any other formulation comprised in the system.

Another aspect of the present application provides a pet food feeding system that comprises two or more formulations, each of which contains between about 25 wt % and about 70 wt % protein supplying ingredients, between about 45 wt % and about 70 wt % carbohydrate supplying ingredients, between about 1.5 wt % and about 12 wt % of fats and oils, and between about 4 wt % and about 12 wt % of total dietary fiber, preferably including between about 1 wt % and 2.5 wt % of total fermentable fiber, wherein each formulation in the system preferably has a consistent ratio of total dietary fiber: total fermentable fiber (TDF:TFF) between about 1.6:1 and about 12:1. In some forms of the disclosure, between 40 wt % and 95 wt % of each formulation in the system are unique ingredients (excluding additives such as vitamins and minerals) when compared with any other formulation comprised in the system. In other forms, at least 40, 45, 50, 55, 60, 65, 70, 75, 80, 85, 90, 95 or even 94.5 wt % of each formulation in the system are unique ingredients (excluding additives such as vitamins and minerals) when compared with any other formulation comprised in the system. In one embodiment, there are at least 4 unique ingredients in each of the formulations comprised in the feeding system. In another embodiment, there are at least 5 unique ingredients (excluding additives such as vitamins and minerals) in each of the formulations comprised in the feeding system. In yet another embodiment, there are at least 6 unique ingredients in each of the formulations comprised in the feeding system. In some embodiments, the formulation further includes additives, preferably up to about 6 wt %, and more preferably 1 wt % to about 6 wt %, more preferably 2 wt % to about 6 wt %, even more preferably about 3 wt % to about 6 wt %, and most preferably about 4 wt % to about 6 wt %.

In one aspect of the present disclosure, each formulation comprised in the system provided herein further has an approximately consistent level of starch gelatinization. Preferably, the level of starch gelatinization does not vary more than 15% between any two formulations in the system, wherein the % difference is calculated based on the total starch gelatinization (e.g., a formulation having 83% and a formulation having 98% starch gelatinization would vary by 15%). Even more preferably, the starch gelatinization does not vary more than 14%, 13%, 12%, 11%, 10%, 9%, 8%, 7%, 6%, 5%, 4%, 4%, 3%, 2%, 1%, or less between any two formulations in the system. Preferably, the starch gelatinization is at least 83%. Even more preferably, the level of starch gelatinization in each formulation of the system is between 83% and 98%, 83% and 97%, 83% and 96%, 83% and 95%, 83% and 94%, 83% and 93%, 84% and 92%, 84% and 93%, 84% and 95%, 84% and 96%, 85% and 91%, 85.5 and 90%, 86% and 89%, 86.5% and 88%, and is most preferably about 87%.

In another aspect of the present disclosure, each formulation comprised in the system has an approximately consistent caloric density. Preferably, the caloric density between any two formulations in the system has a variation of less than 5%, more preferably less than 4%, still more preferably less than 3%, even more preferably less than 2%, and most preferably less than 1%. In one embodiment, the caloric density of the formulations in the system is expressed as kcal/cup metabolizable energy ("ME"), kcal/kg ME, or kcal/can ME.

In another aspect of the present disclosure, each formulation comprised in the system additionally provides similar or consistent palatability.

In another aspect of the present disclosure, each formulation comprised in the system further has a unique kibble shape to provide varieties of texture and kibble mouthfeel to the pet.

In one aspect of the present disclosure, the level of protein supplying ingredients of each formulation comprised in the system is between about 25 wt % and about 50 wt %. In other embodiments, the level of protein supplying ingredients of each formulation comprised in the system is between about 25 wt % and about 30 wt %, 25 wt % and about 35 wt %, 30 wt % and about 35 wt %, 30 wt % and about 45 wt %, 30 wt % and about 40 wt %, about 40 wt % and about 45 wt %, about 45 wt % and about 50 wt %, about 35 wt % and about 40 wt %, about 35 wt % and about 45 wt %, or about 40 wt % and about 50 wt %.

In another aspect of the present disclosure, the level of protein supplying ingredients of each formulation comprised in the system is between about 25 wt % and about 70 wt %. Protein levels at the higher end would be especially suited to a grain-free, high protein diet. In other embodiments for such a diet, the level of protein supplying ingredients of each formulation comprised in the system is between about 45 wt % and about 70 wt %, about 50 wt % and about 70 wt %, about 60 wt % and about 70 wt %, about 50 wt % and about 60 wt %, about 50 wt % and about 65 wt %, about 45 wt % and about 65 wt %, or about 65 wt % and about 70 wt %.

In one aspect of the present disclosure, the carbohydrate level of each formulation comprised in the system is between about 45 wt % and about 70 wt %. In other embodiments, the carbohydrate level of each formulation comprised in the system is between about 45 wt % and about 50 wt %, about 45 wt % and about 55 wt %, about 45% and about 60 wt %, about 45 wt % and about 65 wt %, about 50 wt % and about 70 wt %, about 55 wt % and about 65 wt %, about 55 wt % and about 70 wt %, about 50 wt % and about 55 wt %, about 55 wt % and about 60 wt %, about 60 wt % and about 65 wt %, or about 65 wt % and about 70 wt %, about 46 wt % to about 54 wt %, or about 48 wt % to about 53 wt %.

In another aspect of the present disclosure, the carbohydrate level of each formulation comprised in the system is between about 30 wt % and about 70 wt %. Carbohydrate levels at the lower end would be especially suited to grain-free, high protein diets. In other embodiments, the carbohydrate level of each formulation comprised in the system is between about 30 wt % and about 60 wt %, about 30 wt % and about 50 wt %, about 30 wt % and about 40 wt %, about 35 wt % and about 65 wt %, about 35 wt % and about 55 wt %, about 35 wt % and about 45 wt %, about 30 wt % and about 45 wt %, or about 40 wt % and about 45 wt.

In one aspect of the present disclosure, the TDF:TFF ratio of each formulation comprised in the system is between about 1.6:1 and about 12:1. Preferably the ratios within each formulation in the system do not vary more than 4×, and even more preferably more than 3×, and still more preferably more than 2×. For example, if the formulation having the lowest TDF:TFF ratio in a system had a TDF:TFF ratio of 1.6:1, all formulations in the system should have TDF:TFF ratios between 1.6:1 and about 4.8:1 if the variation was up to 3×. Similarly, if the formulation having the lowest TDF:TFF ratio in a system had a TDF:TFF ratio of 5:1, all formulations in the system should have TDF:TFF ratios between 5:1 and about 10:1 if the variation was up to 2×. In some preferred forms, the TDF:TFF ratio is between about 1.8:1 and about 11:1, about 2:1 and about 10:1, about 2.3:1 and about 9:1, about 2.6:1 and about 8:1, about 2.8:1 and about 7:1. In other preferred forms, the TDF:TFF ratio is between about 3:1 and about 6:1, more preferably 3.2:1 and about 5:1, still more preferably 3.5:1 and about 4.5:1, even more preferably 3.7:1 and 4.3:1, and most preferably about 4:1. The total dietary fiber of each formulation comprised in the system is the sum of soluble and insoluble fiber contributed by all ingredients in the formulation. The total fermentable fiber of each formulation comprised in the system is the sum of soluble fiber, stachyose and raffinose contributed by all ingredients in the formulation.

In some aspects, the additive comprised in the pet food feeding system is selected from the group consisting of flavorings, colorings, vitamins, minerals, nutrient supplements, preservatives, processing aids, herbs, spices, and any combinations thereof.

Also provided by this application is a pet food feeding system or a packaged pet food product comprising two or more formulations, each containing between about 25 wt % and about 70 wt % protein supplying ingredients, between about 30 wt % and about 70 wt % carbohydrate supplying ingredients, between about 1.5 wt % and about 12 wt % fats and oils, optionally up to about 6 wt % additives, between about 4 wt % and about 12 wt % total dietary fiber, including about 1 wt % and 2.5 wt % total fermentable fiber, preferably wherein each formulation in the system has an approximately consistent ratio of total dietary fiber: total fermentable fiber (TDF:TFF) between about 1.6:1 and about 12:1, more preferably between about 2.5:1 and about 9:1, and still more preferably between about 3:1 and about 6:1. Preferably, the TDF:TFF ratio for each formulation in the feeding system has a variation of less than 4×, more preferably less than 3×, and still more preferably less than 2×. In some forms of the disclosure, between 40 wt % and 95 wt % of each formulation in the system are unique ingredients when compared with any other formulation comprised in the system. In other forms, at least 40, 45, 50, 55, 60, 65, 70, 75, 80, 85, 90, 95 or even 94.5 wt % of each formulation in the system are unique ingredients when compared with other formulations comprised in the system, and wherein each formulation in the system or the product has an approximately consistent level of starch gelatinization. Preferably, the level of starch gelatinization does not vary more than 15% between any two formulations in the system, wherein the % difference is calculated based on the total starch gelatinization (e.g., a formulation having 83% and a formulation having 98% starch gelatinization would vary by 15%). Even more preferably, the starch gelatinization does not vary more than 14%, 13%, 12%, 11%, 10%, 9%, 8%, 7%, 6%, 5%, 4%, 4%, 3%, 2%, 1%, or less between any two formulations in the system. Preferably, the starch gelatinization is at least 83%. Even more preferably, the level of starch gelatinization in each formulation of the system is between 83% and 98%, 83% and 97%, 83% and 96%, 83% and 95%, 83% and 94%, 83% and 93%, 84% and 92%, 84% and 93%, 84% and 95%, 84% and 96%, 85% and 91%, 85.5 and 90%, 86% and 89%, 86.5% and 88%, and is most preferably about 87%.

The present application further provides a pet food feeding system or a packaged product comprising two or more formulations, each containing between about 25 wt % and about 70 wt % protein supplying ingredients, between about 30 wt % and about 70 wt % carbohydrate supplying ingredients, between about 1.5 wt % and about 12 wt % fats and oils, optionally up to about 6 wt % additives, between about 4 wt % and about 12 wt % total dietary fiber, and between about 1 wt % and 2.5 wt % total fermentable fiber, preferably wherein each formulation in the system has a consistent ratio of total dietary fiber: total fermentable fiber (TDF:TFF) between about 1.6:1 and about 12:1, more preferably between about 2.5:1 and about 9:1, and still more preferably between about 3:1 and about 6:1. Preferably, the TDF:TFF ratio has a variation of less than 4×, more preferably less than 3×, and still more preferably less than 2× wherein at least 40 wt % of each formulation in the system are unique ingredients when compared with other formulations comprised in the system, wherein each formulation in the system has an approximately consistent level of starch gelatinization of at least 83%, and wherein each formulation has an approximately consistent caloric density with a deviation less than 5%, 4%, 3%, 2%, or 1%.

Additionally provided by the application is a packaged pet food product or system comprising two or more formulations, each containing between about 25 wt % and about 70 wt % protein supplying ingredients, between about 30 wt % and about 70 wt % carbohydrate supplying ingredients, between about 1.5 wt % and about 12 wt % fats and oils, optionally up to about 6 wt % additives, between about 4 wt % and about 12 wt % of total dietary fiber, and between about 1 wt % and 2.5 wt % total fermentable fiber, wherein each formulation in the product preferably has a consistent ratio of total dietary fiber: total fermentable fiber (TDF:TFF) between about 1.6:1 and about 12:1, more preferably between about 2.5:1 and about 9:1, and still more preferably between about 3:1 and about 6:1. Preferably, the TDF:TFF ratio has a variation of less than 4×, more preferably less than 3×, and still more preferably less than 2×, and wherein at least 40 wt % of each formulation in the product are unique ingredients when compared with other formulations comprised in the product.

Also provided in the present application is a packaged pet food product or system comprising two or more formulations, each containing between about 25 wt % and about 70 wt % protein supplying ingredients, between about 30 wt % and about 70 wt % carbohydrate supplying ingredients, between about 1.5 wt % and about 12 wt % fats and oils, optionally up to about 6 wt % additives, between about 4 wt % and about 12 wt % total dietary fiber, and between about 1 wt % and 2.5 wt % total fermentable fiber, wherein each formulation in the product preferably has a consistent ratio of total dietary fiber: total fermentable fiber (TDF:TFF) between about 1.6:1 and about 12:1, more preferably between about 2.5:1 and about 9:1, and still more preferably between about 3:1 and about 6:1. Preferably, the TDF:TFF ratio has a variation of less than 4×, more preferably less than 3×, and still more preferably less than 2×, wherein at least 40 wt % of each formulation in the product are unique ingredients when compared with other formulations comprised in the product, and wherein each formulation in the product has an approximately consistent level of starch gelatinization of at least 83%.

Further provided in the present application is a packaged pet food product comprising two or more formulations, each containing between about 25 wt % and about 70 wt % protein supplying ingredients, between about 30 wt % and about 70 wt % carbohydrate supplying ingredients, between about 1.5 wt % and about 12 wt % fats and oils, optionally up to about 6 wt % additives, between about 4 wt % and about 12 wt % total dietary fiber, and between about 1 wt % and 2.5 wt % total fermentable fiber, wherein each formulation in the product preferably has a consistent ratio of total dietary fiber: total fermentable fiber (TDF:TFF) between about 1.6:1 and about 12:1, more preferably between about 2.5:1 and about 9:1, and still more preferably between about 3:1 and about 6:1. Preferably, the TDF:TFF ratio has a variation of less than 4×, more preferably less than 3×, and still more preferably less than 2×, wherein at least 40 wt % of each formulation in the product are unique ingredients when compared with other formulations comprised in the system, wherein each formulation in the product has an approximately consistent level of starch gelatinization of at least 83%, and wherein each formulation has an approximately consistent caloric density with a deviation less than 5%.

A further aspect of the present disclosure provides a pet food feeding system or a packaged pet food product comprising three or more formulations, each containing between about 25 wt % and about 70 wt % protein supplying ingredients, between about 30 wt % and about 70 wt % carbohydrate supplying ingredients, between about 1.5 wt % and about 12 wt % fats and oils, optionally up to about 6 wt % additives, between about 4 wt % and about 12 wt % total dietary fiber, and between about 1 wt % and 2.5 wt % total fermentable fiber, wherein each formulation in the product preferably has a consistent ratio of total dietary fiber: total fermentable fiber (TDF:TFF) between about 1.6:1 and about 12:1, more preferably between about 2.5:1 and about 9:1, and still more preferably between about 3:1 and about 6:1. Preferably, the TDF:TFF ratio has a variation of less than 4×, more preferably less than 3×, and still more preferably less than 2×, wherein at least 50 wt % of each formulation in the product are unique ingredients when compared with other formulations comprised in the system, wherein each formulation in the product has an approximately consistent level of starch gelatinization of at least 83%, and wherein each formulation has an approximately consistent caloric density with a deviation less than 5%.

Another aspect of the present disclosure provides a pet food feeding system or a packaged pet food product comprising four or more formulations, each containing between about 25 wt % and about 70 wt % protein supplying ingredients, between about 30 wt % and about 70 wt % carbohydrate supplying ingredients, between about 1.5 wt % and about 12 wt % fats and oils, optionally up to about 6 wt % additives, between about 4 wt % and about 12 wt % total dietary fiber, and between about 1 wt % and 2.5 wt % total fermentable fiber, wherein each formulation in the product preferably has a consistent ratio of total dietary fiber: total fermentable fiber (TDF:TFF) between about 1.6:1 and about 12:1, more preferably between about 2.5:1 and about 9:1, and still more preferably between about 3:1 and about 6:1. Preferably, the TDF:TFF ratio has a variation of less than 4×, more preferably less than 3×, and still more preferably less than 2×, wherein at least 50 wt % of each formulation in the product are unique ingredients when compared with other formulations comprised in the system, wherein each formulation in the product has an approximately consistent level of starch gelatinization of at least 83%, and wherein each formulation has an approximately consistent caloric density with a deviation less than 5%.

Additionally, the present application provides a method of feeding a pet using a pet food feeding system as disclosed herein. In general, the method includes feeding the pet each of two or more formulations comprised in the pet food feeding system at least once during a predetermined period of time, wherein each of the two or more formulations provides a complete and balanced nutrient profile according to the Association of American Feed Control Officials (AAFCO) or other governing standards, and diversified ingredients and flavors with minimized digestive stresses to the pet. In one embodiment, the two or more formulations comprised in the pet food feeding system comprises between about 25 wt % and about 70 wt % protein supplying ingredients, between about 30 wt % and about 70 wt % carbohydrate supplying ingredients, between about 1.5 wt % and about 12 wt % fats and oils, optionally up to about 6 wt % additives, between about 4 wt % and about 12 wt % total dietary fiber, and between about 1 wt % and 2.5 wt % total fermentable fiber, wherein each formulation in the system preferably has a consistent ratio of total dietary fiber: total fermentable fiber (TDF:TFF) between about 1.6:1 and about 12:1, more preferably between about 2.5:1 and about 9:1, and still more preferably between about 3:1 and about 6:1. Preferably, the TDF:TFF ratio has a variation of less than 4×, more preferably less than 3×, and still more preferably less than 2×. Preferably at least 40 wt % of each formulation in the system are unique ingredients when compared with other formulations comprised in the system. Additionally, in some embodiments, each formulation in the system has a consistent level of starch gelatinization, preferably of at least 83%. Further, in some embodiments, each formulation in the system has an approximately consistent caloric density with a variance less than 5%. In some embodiments, the pet food feeding system used in the method is a packaged pet food product. In some embodiments, the predetermined period of time in the method is a meal, a day, a week, a month, two months, three months, six months, or any length of time period therebetween. In some other embodiments, the two or more formulations comprised in the pet food feeding system are fed to the pet in any order, at any frequency.

The present disclosure also provides a pet food feeding system comprising three formulations, each containing between about 35 wt % and about 45 wt % protein supplying ingredients, between about 45 wt % and about 55 wt % carbohydrate supplying ingredients, between about 4 wt % and about 8 wt % fats and oils, between about 4 wt % and 6 wt % of additives, between about 7 wt % and about 8 wt % total dietary fiber, between about 1.5 wt % and 2 wt % total fermentable fiber, wherein each formulation in the system has an approximately consistent ratio of total dietary fiber: total fermentable fiber (TDF:TFF) between about 3.5:1 to about 5:1, wherein at least 50 wt % of each formulation in the product are unique ingredients when compared with other formulations comprised in the system, wherein each formulation in the product has an approximately consistent level of starch gelatinization between about 83% and about 93%, and wherein each formulation has an approximately consistent caloric density with a deviation less than 5%.

Further provided in the application are methods of providing a pet a diet with diversified ingredients and flavors, by feeding the pet each of two or more formulations comprised in the pet food feeding system at least once during a predetermined period of time, wherein each of the two or more formulations provides a complete and balanced nutrient profile according to AAFCO or other governing standards, and diversified ingredients and flavors. Each of the two or more formulations comprised in the pet food feeding system used for the method is as described herein. In some forms, the formulations comprise between about 25 wt % and about 70 wt % protein supplying ingredients, between about 30 wt % and about 70 wt % carbohydrate supplying ingredients, between about 1.5 wt % and about 12 wt % fats and oils, up to about 6 wt % additives, between about 4 wt % and about 12 wt % total dietary fiber, and between about 1 wt % and 2.5 wt % total fermentable fiber, wherein each formulation in the system has a consistent ratio of total dietary fiber: total fermentable fiber (TDF:TFF) between about 1.6:1 and about 12:1, more preferably between about 2.5:1 and about 9:1, and still more preferably between about 3:1 and about 6:1. Preferably, the TDF:TFF ratio has a variation of less than 4×, more preferably less than 3×, and still more preferably less than 2×. Preferably at least 40 wt % of each formulation in the system are unique ingredients when compared with other formulations comprised in the system. Preferably, each formulation in the system has a consistent level of starch gelatinization of at least 83%. Further, in some embodiments, each formulation in the system has an approximately consistent caloric density with a variance less than 5%, and wherein the feeding does not cause digestive stresses to the pet.

In one aspect, the pet food feeding system used in the above method is a packaged pet food product. In one embodiment, the predetermined period of time is a meal, a day, a week, a month, two months, three months, six months, or any length of time period therebetween. In another embodiment, the two or more formulations comprised in the pet food feeding system are fed to the pet in any order, at any frequency.

In another aspect, the pet food feeding system is in a form of a supplement.

All ranges provided herein include each and every value in the range as well as all sub-ranges therebetween as if each such value or sub-range was disclosed. Further, all aspects and embodiments of the disclosure can comprise, consist essentially of, or consist of any aspect or embodiment or combination of aspects and embodiments disclosed herein.

Other aspects and iterations of the invention are described in more detail below.

DETAILED DESCRIPTION

Figure 1:
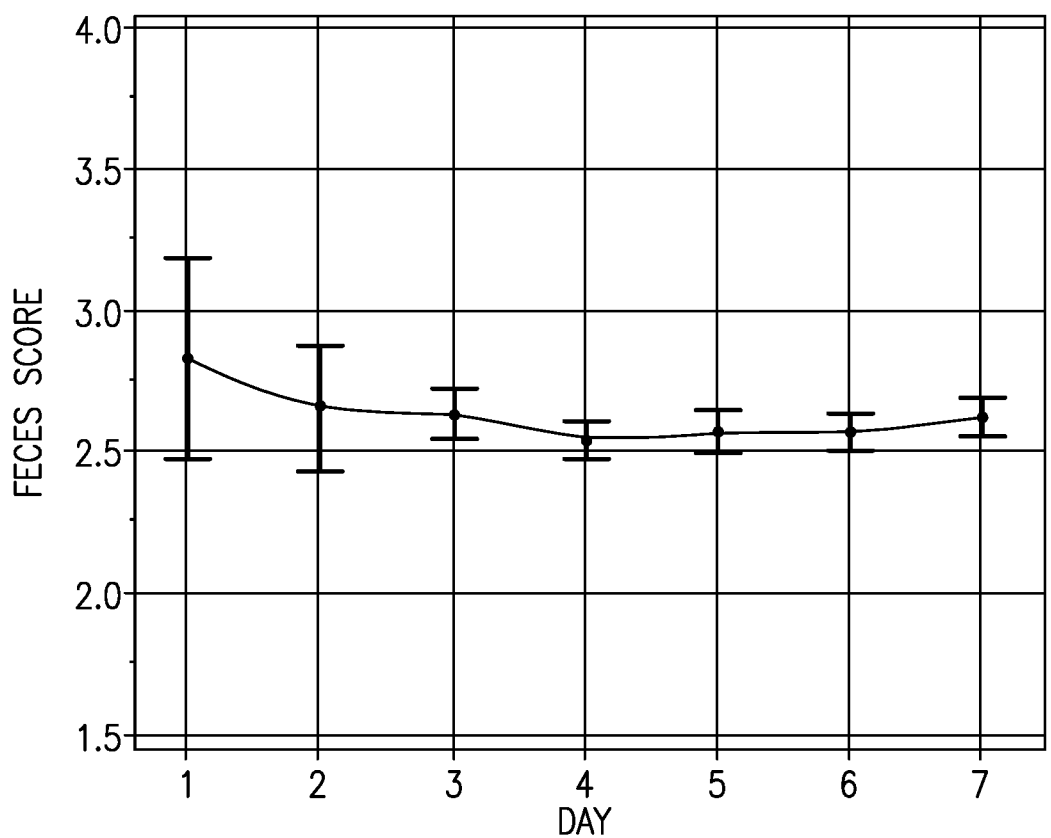
FIG. 1 depicts Chicken & Brown Rice Mean±95% CI Fecal Score by Day.

The present application provides for a pet food feeding system comprising multiple different formulations, each having various combinations of proteins, carbohydrates, fats and oils to conveniently serve complete and balanced nutrients along with diversified ingredients and varied flavors to pet animals at any time period and in any order with minimized digestive problems to the animal. The pet food feeding system comprises two or more formulations containing about 25-70 wt % (of total weight of the formulation, same below) protein supplying ingredients, about 30-70 wt % carbohydrate supplying ingredients, 1.5-12 wt % fats and oils. Each formulation in the system has about 4-12 wt % total dietary fiber, and 1-2.5 wt % total fermentable fiber. Preferably, each formulation in the system has a consistent ratio of total dietary fiber: total fermentable fiber (the TDF:TFF ratio) between about 1.6:1 and about 12:1, more preferably between about 2.5:1 and about 9:1, and still more preferably between about 3:1 and about 6:1. Preferably, the TDF:TFF ratio has a variation of less than 4×, more preferably less than 3×, and still more preferably less than 2×. However, each formulation is unique in its recipe, and individually meets the AAFCO nutritional requirements or other governing standards. In some forms of the disclosure, between 40 wt % and 95 wt % of each formulation in the system are unique ingredients when compared with any other formulation comprised in the system. In some other forms, at least 40, 45, 50, 55, 60, 65, 70, 75, 80, 85, 90, or even 94.5 wt % of each formulation in the system comes from ingredients that are different from any other formulations included in the system, and the different ingredients may be one or more protein, one or more carbohydrate, one or more oil, or any combination(s) thereof.

In each particular pet food feeding system, the percentage of the total protein supplying ingredients is approximately consistent, preferably within 20% of all the different formulations in the system, and the protein supplying ingredients in each formulation in the system may be between about 25 wt % and about 70 wt %. More preferably, the difference of protein supplying ingredients in among all of the formulations of the system is within 19%, 18%, 17%, 16%, 15%, 14%, 13%, 12%, 11%, 10%, 9%, 8%, 7%, 6%, 5%, 4%, 3%, 2%, 1%, or less of all of the other formulations in the system. In one pet food feeding system, the protein supplying ingredients in each formulation comprised in the feeding system is about 30-35 wt %. In one pet food feeding system, the protein supplying ingredients in each formulation comprised in the feeding system is about 35-40 wt %. In another pet food feeding system, the protein supplying ingredients in each formulation comprised in the system is about 40-45 wt %. Yet in another pet food feeding system, the protein supplying ingredients in each formulation comprised in the system is about 45-70 wt %, 50-70 wt %, or even 60-70 wt %.

In each particular pet food feeding system, the percentage of the total carbohydrate supplying ingredients is approximately consistent, preferably within 20% among all the different formulations in the system, and the carbohydrate supplying ingredients in each formulation in the system may be between about 30 wt % and about 70 wt %. More preferably, the difference of carbohydrate supplying ingredients among all of the formulations of the system is within 19%, 18%, 17%, 16%, 15%, 14%, 13%, 12%, 11%, 10%, 9%, 8%, 7%, 6%, 5%, 4%, 3%, 2%, 1%, or less of all of the other formulations in the system. In one pet food feeding system, the carbohydrate supplying ingredients in each formulation comprised in the feeding system is about 45-60 wt %. In another pet food feeding system, the carbohydrate supplying ingredients in each formulation comprised in the system is about 50-55 wt %. Yet in another pet food feeding system, the carbohydrate supplying ingredients in each formulation comprised in the system is about 48-53 wt %, 30-40 wt %, 30-38 wt %, 35-43 wt %, or 37-44 wt %.

In each particular pet food feeding system, the percentage of the total fats and oils is approximately consistent among all the different formulations in the system, preferably within 20% among all the different formulations in the system. More preferably, the difference of fat and oil supplying ingredients among all of the formulations of the system is within 19%, 18%, 17%, 16%, 15%, 14%, 13%, 12%, 11%, 10%, 9%, 8%, 7%, 6%, 5%, 4%, 3%, 2%, 1%, or less of all of the other formulations in the system. The level of fats and oils of each formulation in the system may be between about 1.5 wt % and about 12 wt %. In one pet food feeding system, the fat and oil level of each formulation comprised in the feeding system is about 2-4 wt %. In one pet food feeding system, the fat and oil level of each formulation comprised in the feeding system is about 4-6 wt %. In another pet food feeding system, the fat and oil level of each formulation comprised in the system is about 6-8 wt %. Yet in another pet food feeding system, the fat and oil level of each formulation comprised in the system is about 5-7 wt %, 2-6 wt %, 3-8 wt %, or 5-12 wt %.

In one aspect of the present disclosure, the TDF:TFF ratio of each formulation comprised in the system is between about 3:1 and about 6:1, more preferably 3.2:1 and about 5:1, still more preferably 3.5:1 and about 4.5:1, even more preferably 3.7:1 and 4.3:1, and most preferably about 4:1.

In some embodiments, the formulation further includes additives, preferably up to about 6 wt %, and more preferably 1 wt % to about 6 wt %, more preferably 2 wt % to about 6 wt %, even more preferably about 3 wt % to about 6 wt %, and most preferably about 4 wt % to about 6 wt %.

In one embodiment, the pet food feeding system has two or three formulations with different recipes. In one embodiment, the pet food feeding system has up to five formulations with different recipes. In one embodiment, the pet food feeding system has up to ten formulations with different recipes. In one embodiment, the pet food feeding system has up to twenty formulations with different recipes. In yet another embodiment, the pet food feeding system has an increased number of formulations with different recipes as they are being developed and becoming available; and each formulation that is added into the system has unique ingredients or combinations of ingredients and meets the required parameters described herein for the feeding system.

The present application also provides for a pet food feeding system comprising two or more formulations containing about 25-50 wt % protein supplying ingredients, about 45-70 wt % carbohydrate supplying ingredients, 1.5-12 wt % fats and oils, and optionally 4-6 wt % additives;

wherein each formulation in the system has about 4-12 wt % total dietary fiber, 1-2.5 wt % total fermentable fiber; wherein each formulation in the system preferably has a consistent TDF:TFF ratio between about 1.6:1 and about 12:1, more preferably between about 2.5:1 and about 9:1, and still more preferably between about 3:1 and about 6:1. Preferably, the TDF:TFF ratio has a variation of less than 4×, more preferably less than 3×, and still more preferably less than 2×. Preferably each formulation in the system also has an approximately consistent level of starch gelatinization. Preferably, the level of starch gelatinization does not vary more than 15% between any two formulations in the system, wherein the % difference is calculated based on the total starch gelatinization (e.g., a formulation having 83% and a formulation having 98% starch gelatinization would vary by 15%). Even more preferably, the starch gelatinization does not vary more than 14%, 13%, 12%, 11%, 10% 9%, 8%, 7%, 6%, 5%, 4%, 4%, 3%, 2%, 1%, or less between any two formulations in the system. Preferably, the starch gelatinization is at least 83%. Even more preferably, the level of starch gelatinization in each formulation of the system is between 83% and 98%, 83% and 97%, 83% and 96%, 83% and 95%, 83% and 94%, 83% and 93%, 84% and 92%, 84% and 93%, 84% and 95%, 84% and 96%, 85% and 91%, 85.5 and 90%, 86% and 89%, 86.5% and 88%, and is most preferably about 87%.

The present application further provides for a pet food feeding system comprising two or more formulations containing about 25-70 wt % protein supplying ingredients, about 30-70 wt % carbohydrate supplying ingredients, 1.5-12 wt % fats and oils, and optionally 4-6 wt % additives; wherein each formulation in the system has about 4-12 wt % total dietary fiber, 1-2.5 wt % total fermentable fiber; wherein each formulation in the system preferably has a consistent TDF:TFF ratio between about 1.6:1 and about 12:1, more preferably between about 2.5:1 and about 9:1, and still more preferably between about 3:1 and about 6:1, wherein each formulation in the system has a consistent level of starch gelatinization between about 83% and about 98%, and wherein each formulation in the system has an approximately consistent caloric density (kcal/cup ME, kcal/kg ME, etc.) at any desirable count. Preferably, the caloric density has a variation of less than 5%, more preferably less than 4%, still more preferably less than 3%, even more preferably less than 2%, and most preferably less than 1%. In one embodiment, the caloric density of the formulations in the system is expressed as kcal/cup ME, kcal/kg ME, or kcal/can ME. In some preferred forms, the TDF:TFF ratio for all of the formulations in a system has a variation of less than 4×, more preferably less than 3×, and still more preferably less than 2×.

A pet food feeding system comprising two or more formulations having the above characterizations provides a diversified ingredient and flavor profile to the animals fed with the formulations in the system with minimized digestive problems to the animal despite being fed with different recipes in any combination, at any frequency, in any order, and within any time frame. Because of the abundance and varieties of the ingredients and flavors provided for by the various formulations in the feeding system, and the ease and care-free manner for the pet owner to switch and alternate among the different formulations within the same feeding-system, the feeding system changes the "boring nature" brought by the traditional single formulation diet routine. The pet food feeding system as disclosed herein not only makes the food more attractive and palatable to pets, but also makes the feeding practice more satisfying to pet owners, which as a result improves the quality of the pets' lives and ensures complete and balanced nutritional intake by keeping the pets interested in eating the right amount of food.

The protein source in the formulation comprised in the pet food feeding system may be from animal or non-animal ingredients. Animal protein ingredients may be supplied by fresh or frozen animal-based meat, poultry, fish, or other animal slurries, dairy products or any combinations thereof. Meat-based protein ingredients may include, but not limited to, hogs, cattle, sheep, goats, deer, buffalo, kangaroo, alligator, and the like. Poultry-based protein sources may include, but not limited to, chicken, duck, goose, turkey, guinea hen, and the like. Fish-based protein ingredients may include, but not limited to menhaden, cod, haddock, tuna, salmon, herring, sardine, mackerel, saury, round herring, Alaska pollack, flatfish, anchovy, pilchard, shrimp, clam, crab, lobster, snail and the like. The animal protein ingredient may be in a form of dried powder, or meals of meat, poultry or fish. Non-animal protein ingredients may be plant-based protein derived from such as legumes, tubers, leaves, seeds, nuts, grains and the like. Non-animal protein ingredients may also be derived from algae and yeast. Non-animal protein ingredients may be plant-based protein such as legumes, tubers, leaves, seeds, nuts, grains and the like. Non-animal protein ingredients may also be derived from algae and yeast. Further, the protein supplying ingredients may be preserved with synthetic or natural preservatives or not preserved.

The carbohydrate source in the formulation comprised in the pet food feeding system may be grain-based or non-grain based, or may be derived from fruits, vegetables, or fiber systems. Grain-based carbohydrate ingredients can be obtained from sources including, but not limited to, wheat, rye, barley, oats, rice, sorghum, millet, corn or products from the cereal families, and the like. Non-grain based carbohydrate ingredients can be obtained from sources including, but not limited to, peas, potato, sweet potato, yam, cassava, and other legumes, tubers, seeds, and products from the pseudocereal families. The fruits or vegetables used to provide carbohydrates in each formulation of the feeding system may be whole, dried, fresh, frozen, in the form of pomace, or any combinations thereof. The fiber-rich carbohydrate ingredients in each formulation of the feeding system may come from, but not limited to, fiber systems such as alfalfa meal, rice bran, beet pulp, chicory pulp, flaxseed, seeds, plant pomaces or fractions thereof. Further, the carbohydrate sources may be preserved with synthetic or natural preservatives or not preserved.

The fats and oils in the formulation comprised in the pet food feeding system include topical fat, functional oils, and fat or oils added internally to the kibble at extrusion. Suitable topical fat for pet food includes, but is not limited to, chicken fat or meat tallow. Functional oils for pet food may be those derived from soy, sunflower, coconut, canola, fish, algae, and other suitable oils of plant, animal or microorganism origins. The fats and oils may be raw, refined, powdered, whole, or any combination thereof. Further, the fats and oils may be preserved with synthetic or natural preservatives or not preserved.

The formulation comprised in the pet food feeding system may further include one or more additives. Suitable additives include, but are not limited to, flavorings, colorings, vitamins, minerals, nutrient supplements, preservatives, processing aids, and any combinations thereof. Suitable vitamins for pet food, which may be supplied by various sources, include, but are not limited to vitamin B1, B2, B3, B12, vitamin C, vitamin E, vitamin D, niacin (vitamin PP), biotin (vitamin H), menadione (vitamin K), folic acid (vitamin Bc), pyridoxine (B6), vitamin A, and any combinations thereof. Suitable minerals, which may be supplied by various sources, include, but are not limited to, calcium, potassium, magnesium, sodium, iron, phosphorus, zinc, manganese, iodine, selenium, cobalt, and any combinations thereof.

The pet food feeding system as disclosed herein further requires a consistent ratio of total fermentable fiber to the total dietary fiber among all formulations having different ingredients in the same feeding system. Dietary fiber refers to a group of food constituents that pass through the stomach and the small intestine undigested and reach the large intestine virtually unchanged. Dietary fiber is often made up of indigestible parts of plants and is mainly composed of different types of non-starch polysaccharides (NSP) and lignin. As disclosed in the present application, the total dietary fiber is calculated by the sum of soluble and insoluble fiber in all the ingredients of an individual formulation in the feeding system. Soluble fibers, such as beta-glucan, gums, mucilages (e.g., psyllium), pectins, and some hemicelluloses, dissolve in water, and attract water to form a gel, which slows down digestion. Sources of soluble fiber include, but are not limited to, oatmeal, oat cereal, lentils, apples, oranges, pears, oat bran, strawberries, cranberries, nuts, flaxseeds, beans, spinaches, pumpkins, dried peas, blueberries, psyllium, cucumbers, celery, and carrots. Insoluble fibers, typically cellulose and lignin, are considered to have a laxative effect and helping prevent constipation. Insoluble fibers do not dissolve in water, but rather, pass through the gastrointestinal tract relatively intact and speed up the passage of food and waste. The sources of insoluble fiber include, but not are limited to, whole wheat, whole grains, wheat bran, corn bran, seeds, nuts, barley, couscous, brown rice, bulgur, zucchini, celery, broccoli, cabbage, onions, tomatoes, carrots, cucumbers, green beans, dark leafy vegetables, raisins, grapes, other fruits, and root vegetable skins. Fibers that are readily fermented, broken down, or degraded by bacteria that normally colonize in the colon are called fermentable fibers. In addition to increasing the amount of bacteria in the colon, fermentation results in the formation of short-chain fatty acids (acetate, propionate, and butyrate) and gases which can be absorbed and metabolized to produce energy. The fermentation of fiber also influences fecal bulking due to increased microbial biomass. Highly fermentable fibers include fructo-oligosaccharides and galacto-oligosaccharides (e.g., raffinose and stachyose). In one embodiment, the fermentable fiber in each individual formulation of the pet food feeding system as disclosed herein may be calculated by the sum of soluble fiber, stachyose and raffinose contributed by all the ingredients of an individual formulation. Foods rich in highly fermentable fiber include cabbage, pectin, guar, oats, barley, and legumes, as well as fruits and vegetables. In each particular pet food feeding system, the percentage of the total dietary fiber may vary from about 4 wt % and about 12 wt % among all the different formulations in the system, and the level of total fermentable fiber may vary from about 1 wt % and about 2.5 wt %.

As disclosed in the present application, it was surprising to discover that a proper and approximately consistent ratio of total fermentable fiber to the total dietary fiber, rather than the total dietary fiber itself, in formulations having different recipe/ingredients, keeps the stool quality consistent, and avoids diarrhea, loose stool, and constipation that is generally associated with rapid changes in diet. The ratio of total fermentable fiber to the total dietary fiber (the TDF:TFF ratio) is required to be approximately consistent among all the different formulations in one feeding system. The TDF:TFF ratio for a pet food feeding system that is effective in controlling stool consistency and quality, and avoiding digestive distress while feeding the pets with the different formulations in the system may be within a range from about 1.6:1 and about 12:1, more preferably between about 2.5:1 and about 9:1, and still more preferably between about 3:1 and about 6:1. Preferably, the TDF:TFF ratio has a variation of less than 4× and more preferably less than 3×, and still more preferably less than 2×. In one embodiment, the TDF:TFF ratio of the feeding system is between about 3.2:1 and about 5:1. In another embodiment, the TDF:TFF ratio of the feeding system is about 3.5:1 and about 4.5:1. In yet another embodiment, the TDF:TFF ratio of the feeding system is between about 3.7:1 and 4.3:1. In still another embodiment, the TDF:TFF ratio of the feeding system is about 4:1.

In one embodiment, the pet food feeding system consists of invariable ingredients that are the same in kind and quantity among all formulations in the system, and variable ingredients that may be different in kind, in quantity, or in both kind and quantity among the formulations in the system. In one embodiment, all the variable ingredients in one formulation are the unique ingredients that differentiate the individual formulations in a feeding system. In another embodiment, some of the variable ingredients in a formulation are the unique ingredients that are not shared by other formulations in the feeding system. Both the variable and invariable ingredients may contribute to any of the macronutrient categories, i.e., protein, fat, carbohydrates, and other nutrients. To achieve the consistent TDF:TFF ratio in each different formulation in the feeding system, the percentages of the variable ingredients that contribute to the levels of soluble, insoluble, and fermentable fiber in the total recipe may be adjusted, while keeping the levels of total dietary fiber, and fermentable fiber within the desired range as provided in this disclosure. One of skill in the art is able to obtain, test, or measure the protein, carbohydrate, fat, soluble fiber, insoluble fiber, fermentable fiber levels in each ingredient that is included in the recipe of each formulation, for example, using the official methods of analysis under the AOAC standards (Official Methods of Analysis of AOAC International, 19th Edition, 2012), and determining the adjustment needed for the variable ingredients in order to keep all the parameters at a desirable level, or range.

The pet food feeding system as disclosed herein may further require an approximately consistent level of starch gelatinization, in addition to a consistent TDF:TFF ratio among the different formulations comprised in a pet food feeding system. Gelatinization refers to the irreversible loss of the crystalline regions in starch granules that occurs upon heating in the presence of water, or in the process of cooking. The gelatinization dramatically increases the availability of starch for digestion by amylolytic enzymes. However, gelatinized starch is not in thermodynamic equilibrium, and it undergoes a progressive re-association of the starch molecules upon cooling and aging. This recrystallization is referred to as retrogradation, which reduces the digestibility of the starch by restricting the availability for amylase hydrolysis to occur. As such, under-cooked starch is less digestible, whereas over-cooked starch undergoes retrogradation and turns into resistant starch which is indigestible. To optimize healthy digestion and stool quality in animals consuming the pet food feeding system as disclosed herein, the level of starch gelatinization is designed to avoid under- or over-cooking the starches contained in the recipe.

In one embodiment, the formulation in the pet food feeding system can be manufactured using extrusion cooking technology. Extrusion cooking is a high-temperature, short-time process where the food mixture is exposed to a high pressure and temperature (typically, 80-200° C.) for a relatively short period of time (typically, 10-270 s). A thermal treatment by extrusion achieves desired physical forms, inactivates anti-nutritional factors, increases shelf life, increases digestibility of nutrients and enhances palatability. In addition, the extrusion process gelatinizes the starch. The specific degree of gelatinization can be achieved by a controlled level of cooking—making adjustments at the extruder (either single or double screw), including changes to moisture/steam inputs and ratios, starch hydration time (i.e., retention time), extrusion temperature, pressure, screw speed, screw configuration, die design and open area, back pressure valves and/or restrictor plates, feed rate, sheer, screw compression ratio, energy input, ratio of mechanical and thermal energies etc. One skilled in the area of extrusion, given the starch constituents in the food mixture, is able to achieve the target level of starch gelatinization once that level is determined. Preferably, the level of starch gelatinization does not vary more than 15% between any two formulations in the system, wherein the % difference is calculated based on the total starch gelatinization (e.g., a formulation having 83% and a formulation having 98% starch gelatinization would vary by 15%). Even more preferably, the starch gelatinization does not vary more than 14%, 13%, 12%, 11%, 10%, 9%, 8%, 7%, 6%, 5%, 4%, 4%, 3%, 2%, 1%, or less between any two formulations in the system. Preferably, the starch gelatinization is at least 83%. Even more preferably, the level of starch gelatinization in each formulation of the system is between 83% and 98%, 83% and 97%, 83% and 96%, 83% and 95%, 83% and 94%, 83% and 93%, 84% and 92%, 84% and 93%, 84% and 95%, 84% and 96%, 85% and 91%, 85.5 and 90%, 86% and 89%, 86.5% and 88%, and is most preferably about 87%. In one embodiment, the gelatinization level of the formulations comprised in the pet food feeding system is at least 83%. In one embodiment, the gelatinization level of the formulations comprised in the pet food feeding system is at least 85%. In one embodiment, the gelatinization level of the formulations comprised in the pet food feeding system is between about 83% to about 93%. In yet another embodiment, the gelatinization level of the formulations comprised in the pet food feeding system is 87%.

The pet food feeding system as disclosed herein may further require an approximately consistent caloric density among the different formulations in the feeding system. Caloric density is the metabolizable energy (ME) concentration in a food expressed as kcal per unit (e.g., volume or weight unit, such as liter, gram, kg, can or cup) of food, typically expressed as kcal/cup ME, where the kcal/kg ME is calculated according to the AAFCO defined methodology and a cup has a defined measurement such as 8 oz standard US measuring cup. Determining the caloric density of a food can be done by several methods known to those skilled in the art. Determining the amount of food to feed daily can be estimated based on the animal's daily energy requirement and the number of calories provided per unit of a pet formulation. The average ten pound cat, for example, requires about 250 kcal per day, and the average thirty pound dog requires about 750 kcal per day. If the caloric density of a formulation is 50 kcal/per cup, the ten pound cats needs 5 cups of this formulation per day, while the thirty pound dog needs 15 cups of the formulation per day. When the caloric density, expressed as kcal per cup, is consistent among the different formulations in a feeding system, the total number of cups of food required a day can be calculated based on the uniform caloric density, and one formulation can replace another formulation cup for cup without the need to recalculate and convert the cup numbers for a different formulation thereby enabling pet owners to easily switch between formulations. In one embodiment, the caloric density for each formulation in the pet food feeding system is expressed in kcal per cup, preferably with a deviation no more than 5%, preferably no more than 3%, 2%, 1%, or less. In general, different systems can have different caloric densities ranging from about 250 kcal/cup ME to 500 kcal/cup ME. However, it is preferred that all formulations within a single system have an approximately consistent caloric density as set forth above. In one embodiment, the amount of food is determined by the caloric density of the feeding system and may be further adjusted for the pet's breed, age, and activity level. In another embodiment, the caloric density of the formulations in a feeding system may be designed and predetermined according to the target group of animals based on age, size, weight, life stage or breed. In one embodiment, each formulation in the pet food feeding system as disclosed herein has a caloric density between about 348 kcal/cup to about 365 kcal/cup. Another embodiment has a caloric density of at least about 345 kcal/cup ME.

The pet food feeding system as disclosed herein may further provide similar or consistent palatability among the different formulations in the feeding system, such that the daily intake of the total amount of food is the same irrespective of the different recipe of the formulations fed from the feeding system. Consistent palatability and food intake is desirable for the animals fed on the pet food feeding system as disclosed to enjoy the full range of the ingredient and flavor profile provided by the feeding system and to assure pet owners that pets are receiving proper nutrition. Palatability of the formulations in the feeding system as disclosed herein can be statistically determined by measuring average food intake by a statistically significant number of test animals under standardized conditions. One skilled in the art knows how to formulate different pet food recipes to achieve the same or similarly desired palatability.

In some forms, the pet food feeding system as disclosed herein comprises two or more different formulations that each has a unique kibble shape to provide variety of texture and kibble feel. One skilled in the art is able to make different kibble shapes according to design using processes including extrusion and various die-plate or insert shapes. The variety of ingredients and kibble designs provided across the formulations comprised in the pet food feeding system offers the animals ingredient, flavor and sensory (including taste, aroma, texture and kibble mouthfeel) varieties, to promote health and enjoyment of the animals fed with the pet food feeding system.

In one embodiment, the pet food feeding system comprises three formulations, each containing between about 35 wt % and about 45 wt % protein supplying ingredients, between about 45 wt % and about 55 wt % carbohydrate supplying ingredients, between about 4 wt % and about 8 wt % fats and oils, between about 4 wt % and 6 wt % of additives, between about 7 wt % and about 8 wt % total dietary fiber, between about 1.5 wt % and 2 wt % total fermentable fiber, wherein each formulation in the system has an approximately consistent ratio of total dietary fiber: total fermentable fiber (TDF:TFF) between about 3.5:1 to about 5:1, wherein at least 50 wt % of each formulation in the product are unique ingredients when compared with other formulations comprised in the system, wherein each formulation in the product has an approximately consistent level of starch gelatinization between about 83% and about 93%, and wherein each formulation has an approximately consistent caloric density with a deviation less than 5%.

A pet food feeding system comprising two or more different formulations as disclosed and characterized herein may be expanded by adding new formulations having unique recipes which are designed to share the same parameters required by the particular pet food feeding system. As such, a pet owner can provide the pet with a newly developed formulation that belongs to the same pet food feeding system used by the animal at any time when the new formulation is available in the market. In one embodiment, a pet food feeding system is identified by the relative level of one or more constituents, for example, high protein, high fiber, or high protein low carb. In another embodiment, a pet food feeding system is identified by the "free-from" certain ingredient types or nutrient types such as, but nor limited to, grains, corn, soy, glutens, or by-product meals. In another embodiment, a pet food feeding system is identified by its suitability to animals of certain age, size or breed groups. In one embodiment, all existing and future formulations belonging to one pet food feeding system contain the same color-coding or other easy-to-identify labels. One skilled in the art is capable of matching ingredient and flavor-diversified pet food feeding systems with appropriate labels or signages that effectively convey the necessary information to consumers.

The present application further provides a packaged product containing two or more formulations having different recipes, wherein each formulation contains about 25-70 wt % protein supplying ingredients, about 30-70 wt % carbohydrate supplying ingredients, 1.5-12 wt % of fats and oils, and optionally 4-6 wt % of additives; wherein each formulation in the system has about 4-12 wt % of total dietary fiber, 1-2.5 wt % of total fermentable fiber; wherein each formulation in the system preferably has a consistent TDF:TFF ratio between about 1.6:1 and about 12:1, more preferably between about 2.5:1 and about 9:1, and still more preferably between about 3:1 and about 6:1. Preferably, the TDF:TFF ratio has a variation of less than 4× and more preferably less than 3×, and still more preferably less than 2×. In one embodiment, the two or more formulations having different recipes comprised in the package may be further characterized by a consistent level of starch gelatinization, preferably no less than 83%. In another embodiment, the consistent level of starch gelatinization of the two or more formulations having different recipes comprised in the package is between about 83% and about 98%.

In another embodiment, the two or more formulations having different recipes comprised in the package as disclosed may be further characterized by an approximately consistent caloric density with a variance less than 5% between the formulations comprised in the package. In one embodiment, the consistent caloric density is expressed as kcal per cup ME. In another embodiment, the consistent caloric density is expressed as kcal per gram ME. In yet another embodiment, the consistent caloric density is expressed as kcal per can ME. In yet another embodiment, the consistent caloric density is expressed as kcal per oz. ME. In yet another embodiment, the consistent caloric density is expressed as kcal per piece ME. In one embodiment, the caloric density of the formulations in the packaged product may be designed and predetermined according to the targeting group of animals based on their age, size, weight, life stage and breed. In general, different packages can have different caloric densities ranging from about 250 kcal/cup ME to 500 kcal/cup ME. However, it is preferred that all formulations within a single package have an approximately consistent caloric density as set forth above. In one embodiment, each formulation in the packaged product as disclosed herein has a caloric density between about 348 kcal/cup to 365 kcal/cup. In another embodiment, each formulation has a caloric density of at least about 340 kcal/cup ME. The packaged product as disclosed herein may further comprise a nutrition chart indicating the unique nutritional ingredients of each different formulation contained in the package. In one embodiment, the nutrition chart may contain a color index consistent with the color of each different formulation included in the packaged product.

The packaged product as disclosed herein may additionally comprise instructions providing exemplary feeding programs for meal-by-meal diet transition, daily transition, two-day transition, weekly transition, or bi-weekly transition. It is understood by one skilled in the art that the different formulations in the packaged product with the characterizations as provided herein are suitable for feeding an animal at any meal during a day, on any day of the week, in any week of the month, and during any month of the year. It is understood by one skilled in the art that the different formulations in the packaged product with the characterization as provided herein can be fed in any order and at any frequency, as long as a variety of ingredients or flavors provided by the formulations in the packaged product are given to the animal in a balanced manner within a time period of a meal, one day, two days, three days, a week, two weeks, a month, two months, or three months, or any other length of time. As disclosed in the present application, any feeding practice using the packaged product as described would not cause the animal digestive stresses while the animal enjoys as many as ingredient/flavor variations provided by the various packaged products.

The packaged product as disclosed herein may also include a feeding guideline as to the recommended length of a balancing period, meaning the time period within which each of all or a subgroup of different formulations in the feeding system is recommended to be fed or could be fed to the animal at least once, irrespective of the feeding sequence of different formulations, in order to provide a complete ingredient and flavor profile over a reasonable time span. The suitable and non-limiting balancing period may be three days, a week, two weeks, a month, two months, or three months, or any other length of time. The length of the balancing period can be determined based on the individual flavor variety and/or ingredient diversity in each different formulation in the feeding system. One skilled in the art is able to provide the ideal length of a balancing period based on the ingredient/flavor profiles of the formulations comprised in the feeding system to keep the animals interested and to take full advantage of the packaged product comprising varieties of formulations. In one embodiment, each formulation in the feeding system is fed to the animal an equal number of times or quantities (for example meals, cups, or cans) in each balancing period. In another embodiment, a subgroup of formulations in the feeding system is fed to the animal an equal number of times or quantities within each balancing period, whereas the other formulations may be fed to the animal more or less frequently in any chosen manner over a broader time span than the recommended balancing period. In one embodiment, the packaged product as disclosed comprises the quantity of formulation sufficient for one balancing period. In another embodiment, the packaged product as disclosed comprises the quantity of formulation sufficient for more than one balancing period.

The packaged product as disclosed herein may optionally comprise nutritional guidance providing recommendations to relatively increase or decrease the feeding of one or more specific formulations in the product in order to address or reduce the incidence of or severity of certain conditions of the pet, or to be compatible with the age, size, breed, or activity level of the animal being fed. For example, a formulation with enriched omega 3 and omega 6 fatty acids addresses or reduces the incidence of or severity of hair loss and dull coats. As a further example, some breeds, such as the Siberian Husky, have a genetic tendency to suffer from zinc deficiency because of poor absorption that leads to skin and coat problems. By increasing the portion of omega 3 and omega 6 fatty acids or zinc enriched formulations when feeding the animal with the variety of formulations in the package provides the animal balanced nutrients, diversified ingredients and flavors, and a tailored enhancement on an as-needed basis.

The present application further discloses a method of feeding a pet using a pet food feeding system comprising two or more formulations having different recipes with minimized digestive stress to the pet, wherein each formulation contains about 25-70 wt % (by total weight of the formulation) protein supplying ingredients, about 30-70 wt % carbohydrate supplying ingredients, 1.5-12 wt % of fats and oils, and optionally 4-6 wt % of additives; wherein each formulation in the system has about 4-12 wt % of total dietary fiber, 1-2.5 wt % of total fermentable fiber; wherein each formulation in the system preferably has a consistent TDF:TFF ratio between about 1.6:1 and about 12:1, more preferably between about 2.5:1 and about 9:1, and still more preferably between about 3:1 and about 6:1. Preferably, the TDF:TFF ratio has a variation of less than 4× and more preferably less than 3×, and still more preferably less than 2×; wherein, optionally, each formulation in the system has a consistent level of starch gelatinization of between about 83% and about 98%; and wherein, optionally, each formulation in the system has an approximately consistent caloric density with a variance less than 5%. The method of feeding a pet using the above characterized feeding system comprises feeding the pet each of the two or more formulations comprised in the system at least once during a predetermined period of time, wherein each of the two or more formulations provides a complete and balanced nutrient profile according to AAFCO or other governing body, and diversified ingredients and flavors. In one embodiment, the pet food feeding system is a packaged pet food product.

In one embodiment of a system of the present disclosure, a system including 3 distinct formulations is provided. Each formulation has a recipe wherein at least 40% and preferably at least 50% of the ingredients are different from the ingredients of any other formulation of the system. Further, each formulation contains about 25-70 wt % (by total weight of the formulation) protein supplying ingredients, about 30-70 wt % carbohydrate supplying ingredients, 1.5-12 wt % of fats and oils, and optionally 4-6 wt % of additives; wherein each formulation in the system has about 4-12 wt % of total dietary fiber, 1-2.5 wt % of total fermentable fiber; wherein each formulation in the system preferably has a consistent TDF:TFF ratio between about 1.6:1 and about 12:1, more preferably between about 2.5:1 and about 9:1, and still more preferably between about 3:1 and about 6:1. Preferably, the TDF:TFF ratio has a variation of less than 4× and more preferably less than 3×, and still more preferably less than 2×; wherein, optionally, each formulation in the system has a consistent level of starch gelatinization of between about 83% and about 98%; and wherein, optionally, each formulation in the system has an approximately consistent caloric density with a variance less than 5%. In a specific example of such an embodiment, each formulation would have between 36 to 45 wt % protein supplying ingredients with a guaranteed minimum crude protein analysis of 25%, 45 to 53% carbohydrate supplying ingredients, 4 to 8% fats and oils with a guaranteed minimum crude fat analysis of 15%, a crude fiber guaranteed maximum analysis of 3.5%, 4 to 6% additives, and a guaranteed maximum moisture analysis of 10% wherein the total dietary fiber was between 5.5% to 8%, the total fermentable fiber was between 1.5% and 2.0%, and the TDF:TFF ratio was 2.9:1 to 5.4:1.

In another embodiment of a system of the present disclosure, a system including 4 distinct formulations is provided. Each formulation has a recipe wherein at least 40% and preferably at least 50% of the ingredients are different from the ingredients of any other formulation of the system. Further, each formulation contains about 25-70 wt % (by total weight of the formulation) protein supplying ingredients, about 30-70 wt % carbohydrate supplying ingredients, 1.5-12 wt % of fats and oils, and optionally 4-6 wt % of additives; wherein each formulation in the system has about 4-12 wt % of total dietary fiber, 1-2.5 wt % of total fermentable fiber; wherein each formulation in the system preferably has a consistent TDF:TFF ratio between about 1.6:1 and about 12:1, more preferably between about 2.5:1 and about 9:1, and still more preferably between about 3:1 and about 6:1. Preferably, the TDF:TFF ratio has a variation of less than 4× and more preferably less than 3×, and still more preferably less than 2×; wherein, optionally, each formulation in the system has a consistent level of starch gelatinization of between about 83% and about 98%; and wherein, optionally, each formulation in the system has an approximately consistent caloric density with a variance less than 5%. In a specific example of such an embodiment, each formulation would have between 38 to 47 wt % protein supplying ingredients with a guaranteed minimum crude protein analysis of 25%, 43 to 50% carbohydrate supplying ingredients, 5 to 8% fats and oils with a guaranteed minimum crude fat analysis of 15%, a crude fiber guaranteed maximum analysis of 3.5%, up to to 6% additives, and a guaranteed maximum moisture analysis of 10% wherein the total dietary fiber was between 5.5% to 8%, the total fermentable fiber was between 1.5% and 2.0%, and the TDF:TFF ratio was 3.3:1 to 5.1:1.

EXAMPLES

The following examples are simply intended to further illustrate and explain the present invention. The invention, therefore, should not be limited to any of the details in these examples.

Example 1

A Pet Food Feeding System Comprising Multiple Formulations Having Different Recipes Each of the formulations included in the pet food feeding system, or a packaged product, has a different recipe. There are common ingredients and unique ingredients in each of the recipes. All ingredients either have a functional role, and/or contribute to one or more macronutrients such as protein, carbohydrates, fat, and other types of nutrients including mineral and vitamins. Each recipe, A, B and C in the feeding system depicted in Table 1, contains complete and balanced nutrients at levels meeting the nutritional requirements set by AAFCO (available at World Wide Web jn.nutrition.org/content/124/12_Suppl/2535S.full.pdf). As such, each of the formulations of the pet food feeding system can be used in the traditional stand-alone single formulation feeding practice.

expressed in kcals/cup and palatability contributes to the interchangeability and simplicity in diet alternation of the different formulations in the feeding system of the packaged product. A third group of parameters is the level of starch gelatinization. Lastly, the variable kibble shape of the formulation enhances the sensory and texture feel of the animals fed using the feeding system or packaged product to make the experience more interesting and attractive to the animals.

TABLE 1

Ingredient Composition of different formulations included in a pet food feeding system and the relative guaranteed analysis

|  | Recipe A | Recipe B | Recipe C |
|---|---|---|---|
| Ingredients supplying: | | | |
| Protein approx. % w/w | 40-45% | 36-41% | 37-42% |
| protein | chicken | lamb | salmon |
| protein meals and powders | chicken meal, fishmeal, dried egg | lamb meal, menhaden fish meal | chicken meal, salmon meal |
| non-animal protein | | potato protein | dried brewer's yeast |
| Carbohydrates approx. % w/w | 45-50% | 48-53% | 48-50% |
| grain | brown rice, brewer's rice, oats | brewer's rice, sorghum | rye, brewer's rice, barley |
| non-grain | | chickpeas, dried potatoes | dried peas |
| fruit/vegetable | dried spinach dried blueberry | apple pomace, cranberry pomace | dried carrots, tomato pomace |
| fiber system | rice bran, chicory pulp | alfalfa meal, flaxseed, chicory pulp | chicory pulp |
| Fats and oils approx. % w/w | 4-6% | 5-7% | 6-8% |
| topical fat | chicken fat | chicken fat | chicken fat |
| functional oils | soy oil | soy oil, sunflower oil | sunflower oil |
| Other % approx. w/w | 4-6% | 4-6% | 4-6% |
| flavor system | natural flavor | natural flavor | natural flavor |
| trace vitamins, minerals, and other nutrients and preservatives/processing aids | vitamins, minerals, other nutrients | vitamins, minerals, other nutrients | vitamins, minerals, other nutrients |
| Guaranteed Analysis | | | |
| Crude Protein, min % | 25% | 25% | 25% |
| Crude Fat, min % | 15% | 15% | 15% |
| Crude Fiber, max % | 3.5% | 3.5% | 3.5% |
| Moisture, max % | 10% | 10% | 10% |

While each of the formulations in one feeding system has one or more unique ingredients that contribute to a varied flavor, for the formulations to be included in the same feeding system or a packaged product, the formulations might share a number of parameters in addition to macronutrient levels shown in Table 1. For example, the chicken flavored Recipe A, lamb flavored Recipe B and salmon flavored Recipe C of the exemplary pet food feeding system in Table 2, have 7, 9 and 8 unique ingredients, respectively, further contain total dietary fiber (TDF), total fermentable fiber (TFF), the ratio of TDF:TFF, and optionally, the starch gelatinization level, in the same range of weight percentage, as disclosed herein. These parameters contribute to the features of the feeding system or packaged product, i.e., an unexpected reduction, up to and including no digestive stress upon immediate diet switch despite the different ingredients in the formulations. A second group of parameters including approximately consistent caloric density

TABLE 2

A Pet Food Feeding System Having Three Formulations with Different Recipes:

| | Recipe A Chicken & Brown Rice Recipe | Recipe B Lamb & Potato Recipe | Recipe C Salmon & Barley Recipe |
|---|---|---|---|
| | Formulation | | |
| Protein Supplying Ingredients | 40-45% | 36-41% | 37-42% |
| Carbohydrate Supplying Ingredients | 45-50% | 48-53% | 48-50% |
| Fats And Oils | 4-6% | 5-7% | 6-8% |
| Other | 4-6% | 4-6% | 4-6% |

TABLE 2-continued

A Pet Food Feeding System Having
Three Formulations with Different Recipes:

|  | Recipe A<br>Chicken &<br>Brown Rice<br>Recipe | Recipe B<br>Lamb & Potato<br>Recipe | Recipe C<br>Salmon &<br>Barley Recipe |
|---|---|---|---|
| Variable<br>Ingredients | Chicken<br>Whole Brown<br>Rice<br>Whole Grain<br>Oatmeal<br>Rice Bran<br>Dried Egg<br>Product<br>Dried<br>Blueberry<br>Dried<br>Spinach | Lamb<br>Dried Potatoes<br>Whole Grain<br>Sorghum<br>Lamb Meal<br>Chickpeas<br>Potato Protein<br>Dehydrated<br>Alfalfa Meal<br>Apple Pomace<br>Cranberry<br>Pomace | Salmon<br>Whole Grain<br>Barley<br>Whole Grain<br>Rye<br>Peas<br>Salmon meal<br>Brewers Yeast<br>Tomato<br>Pomace<br>Dried Carrot |
| Invariable<br>Ingredients | Other ingredients providing protein, fat, oil, carbs, fibers, vitamins, minerals, and other nutrients | | |
| Formulated Nutrient Levels (91.5% Dry Matter Basis) | | | |
| Crude Protein wt % | 25.5 | 25.5 | 25.6 |
| Crude Fat wt % | 15.1 | 15.3 | 15.3 |
| Crude Fiber wt % | 1.6 | 2.4 | 1.4 |
| Ash wt % | 8.2 | 7.9 | 6.5 |
| Nitrogen Free Extract (NFE) wt % | 41.2 | 40.6 | 42.7 |
| Total Dietary Fiber wt % | 7.9 | 7.5 | 7.1 |
| Insoluble Dietary Fiber wt % | 6.2 | 6.2 | 5.6 |
| Soluble Dietary Fiber wt % | 1.7 | 1.3 | 1.6 |
| Fermentable fiber (soluble fiber + Raffinose + Stachyose) wt % | 1.6 | 1.5 | 1.9 |
| Additional Relevant Parameters | | | |
| TDF:TFF ratio | 4.9 | 5 | 3.7 |
| MNP (Macronutrient Profile) | Consistent among recipes ± 5% | | |
| Starch Gelatinization | 83-98% | | |
| Caloric Density kcals/cup | Consistent among recipes ± 5% | | |
| Palatability | Consistent among recipes | | |
| Kibble Shape | Different between recipes | | |

Example 2

Performance Test of the Pet Food Feeding System

The pet food feeding system in Table 2 was tested for performance using stool quality assessment. Stool quality was assessed when the formulations of Recipes A, B and C were fed to dogs over a period of 7 days, a time period which is reflective of the expected consumer use of the products. 10 healthy dogs were fed each of the Recipes A, B, C during a 7 day stool quality trial with no transitional feeding phase when each recipe was started. Prior to each trial of the respective recipe, dogs were fed a standard kennel diet for a pre-determined washout period (for example, a 2-day period). Fecal quality was assessed on all feces that were passed during days 1-7 of feeding the Recipes A, B and C. Feces were scored according to the following scale (Table 3):

TABLE 3

Scoring System for Stool Quality Assessment

| Fecal Score | Description |
|---|---|
| 5.0 | Watery diarrhea |
| 4.5 | Diarrhea with some areas of consistency |
| 4.0 | The majority, if not all of the form is lost, poor consistency, viscous |
| 3.5 | Very moist, but still has some definite form |
| 3.0 | Moist, beginning to lose form, leaving a definite mark when picked up |
| 2.5 | Well formed, slightly moist surface, leaves a mark, sticky to touch |
| 2.0 | Well formed, does not leave a mark, 'kickable' |
| 1.5 | Hard and dry |
| 1.0 | Hard, dry and crumbly, 'bullet-like' |

Additionally, the incidence of vomiting was measured as a secondary measure of digestive or stomach upset, which may occur as a response to rapid changes in diet. There was no incidence of vomiting in any dogs throughout the feeding trials.

When the dogs were fed the Chicken & Brown Rice Recipe (Recipe A) during the 7 day period, the mean fecal score for each of the 7 days appeared to be generally consistent. With the mean fecal score being between 2.5-3.0, and closer to 2.5 every day, except for the first day after switching immediately from the standard kennel diet, in the 7-day test period, it demonstrated that the digestive system was generally not under stress when the dogs were given Recipe A (FIG. 1).

Figure 2:
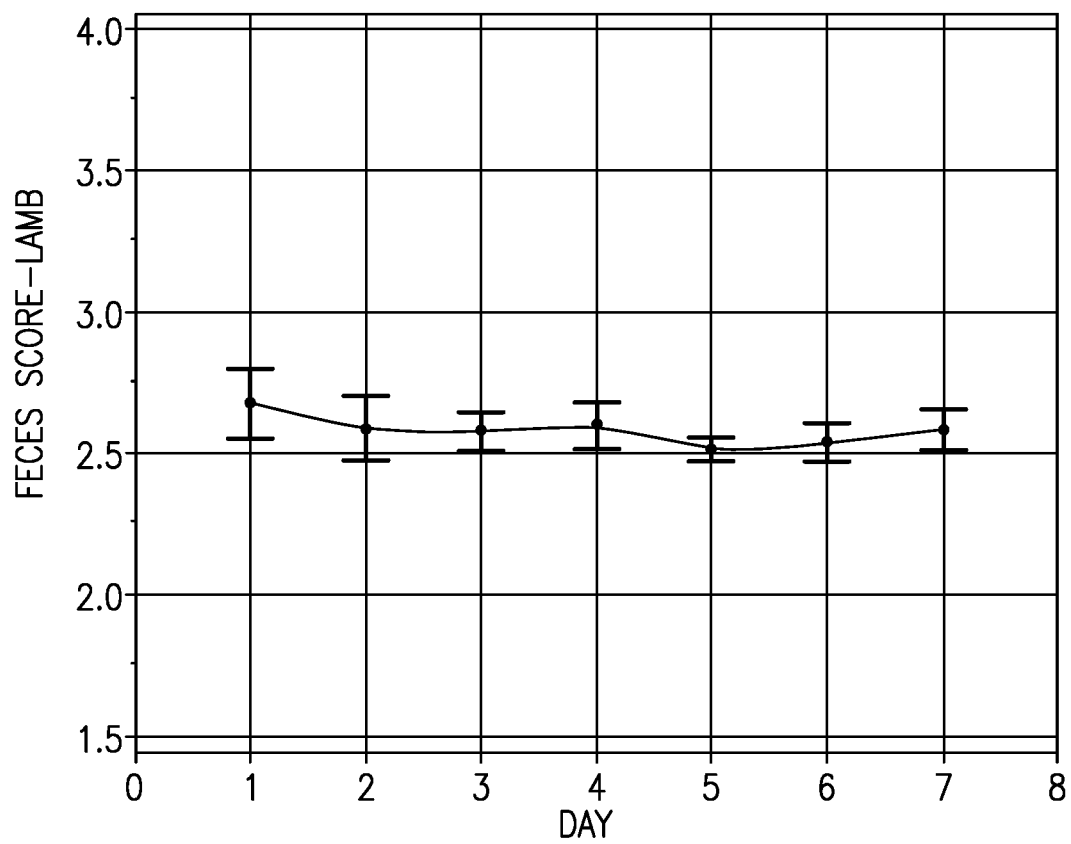
FIG. 2 depicts Lamb & Potato Recipe Mean±95% CI Fecal Score by Day.

When the dogs were fed the Lamb & Potato Recipe (Recipe B) during the 7 day period, the mean fecal score for each of the 7 days appeared to be very consistent. With the mean fecal score being close to 2.5 every day in the 7-day test period, after switching immediately from the standard kennel diet, it demonstrated that the digestive system of the dogs was not under stress when the dogs were given Recipe B (FIG. 2).

Figure 3:
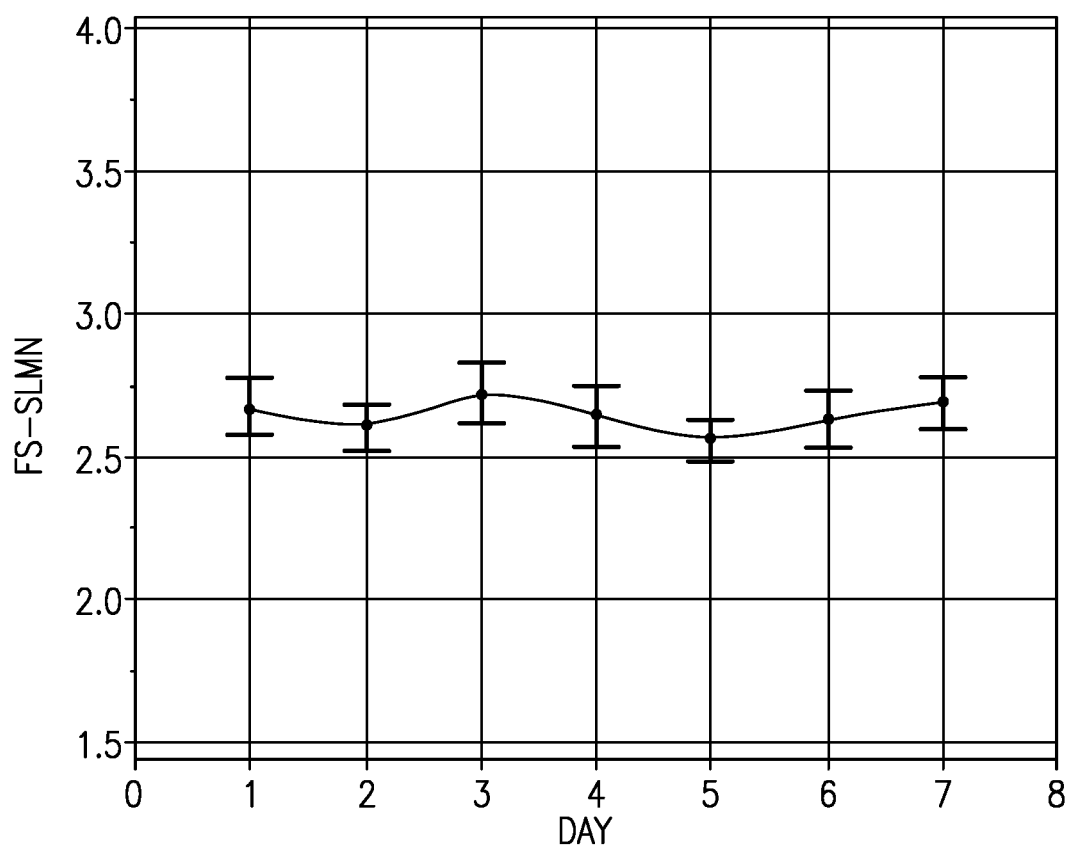
FIG. 3 depicts Salmon & Barley Recipe Mean±95% CI Fecal Score by Day.

When the dogs were fed the Salmon & Barley Recipe (Recipe C) during the 7 day period, the mean fecal score for each of the 7 days appeared to be relatively consistent and was within the 2.5-3 range, which reflects good stool quality with no sign of digestive distress (FIG. 3).

In the next sequential no transition feeding experiment, the 10 healthy dogs were fed a standard kennel diet for a pre-determined washout period before switching to each of Recipes A, B and C. The dogs were fed Recipe A for 7 days, Recipe B for 7 days, and Recipe C for 7 days. Stool quality was assessed on all feces that were passed during days 1-27 of feeding the Recipes A, B and C and washout standard recipe feeding.

Figure 4:
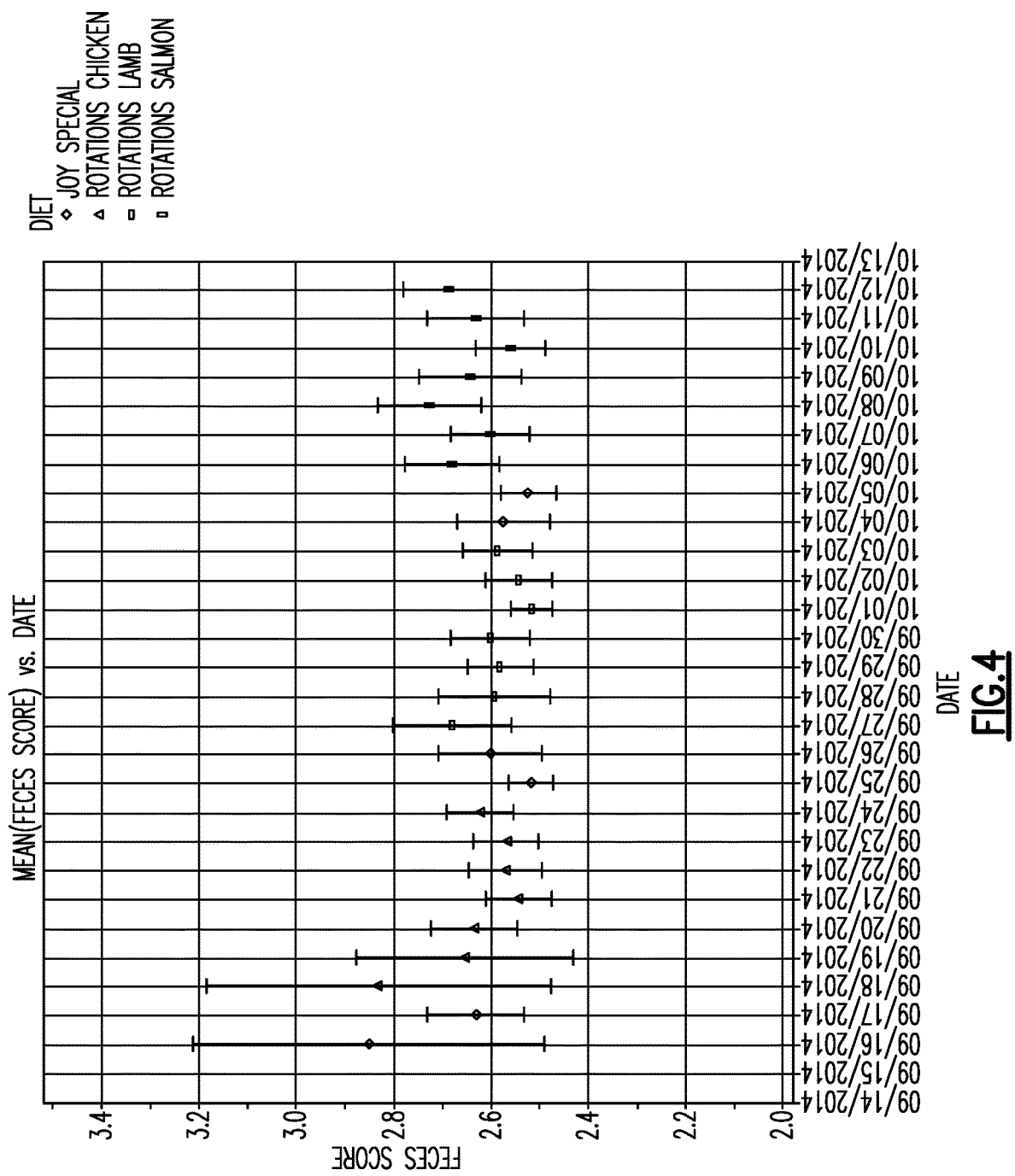
FIG. 4 depicts Mean±95% CI Fecal Score Across Sequential Stool Quality Trials.

To determine the effect of no-transition feeding on stool quality, data for each recipe were further analyzed by ANOVA with Tukey's HSD comparisons between days. There was no effect of the day within each diet (Chicken P=0.19; Lamb P=0.13; Salmon P=0.15), and the mean stool score was not different between days within each recipe (P>0.05). These data indicate that stool score was not affected by abruptly switching to a recipe and that no transition feeding period is needed when switching between recipes (FIG. 4).

Example 3

Gelatinization Level and Stool Quality Assessment

The impact of starch gelatinization in formulations on stool quality was assessed using the scoring system in Table 3.

10 healthy adult dogs were used in this study. Dogs were fed test diets for 7 days with cross over design. Prior to the study, dogs were fed a typical kennel diet for a predetermined wash out period. The test diets had the same recipe but were prepared with 81% and 86% starch gelatinization levels by modifying the extrusion process conditions. Because these two diets were prepared from the same batch on the same day, product density, ingredient quality, and caloric density were the same. Feces scores were recorded throughout the study and analyzed using feces score distribution to see if the score distribution was comparable to that of gelatinization level equal to or higher than 83%, which target level conforms to improvements in fecal quality, reduced stool volume and higher digestibility.

Figure 5:
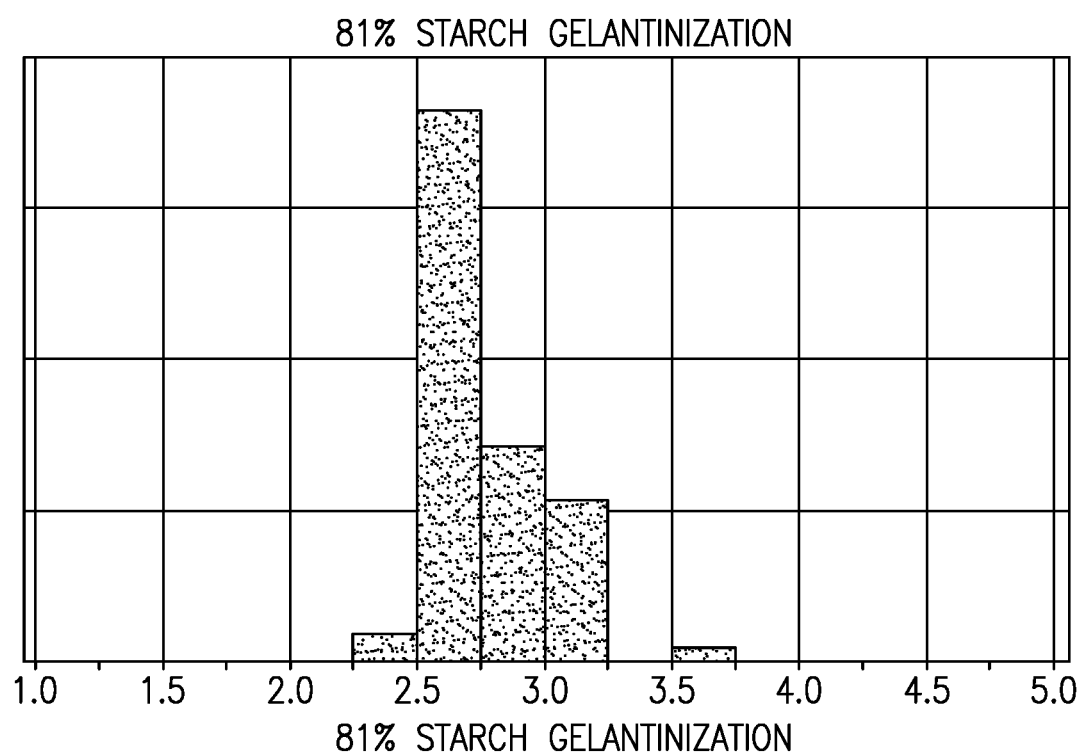
FIG. 5 depicts feces score distribution in diets with 81% starch gelatinization (Mean=2.65, SD=0.22).
Figure 6:
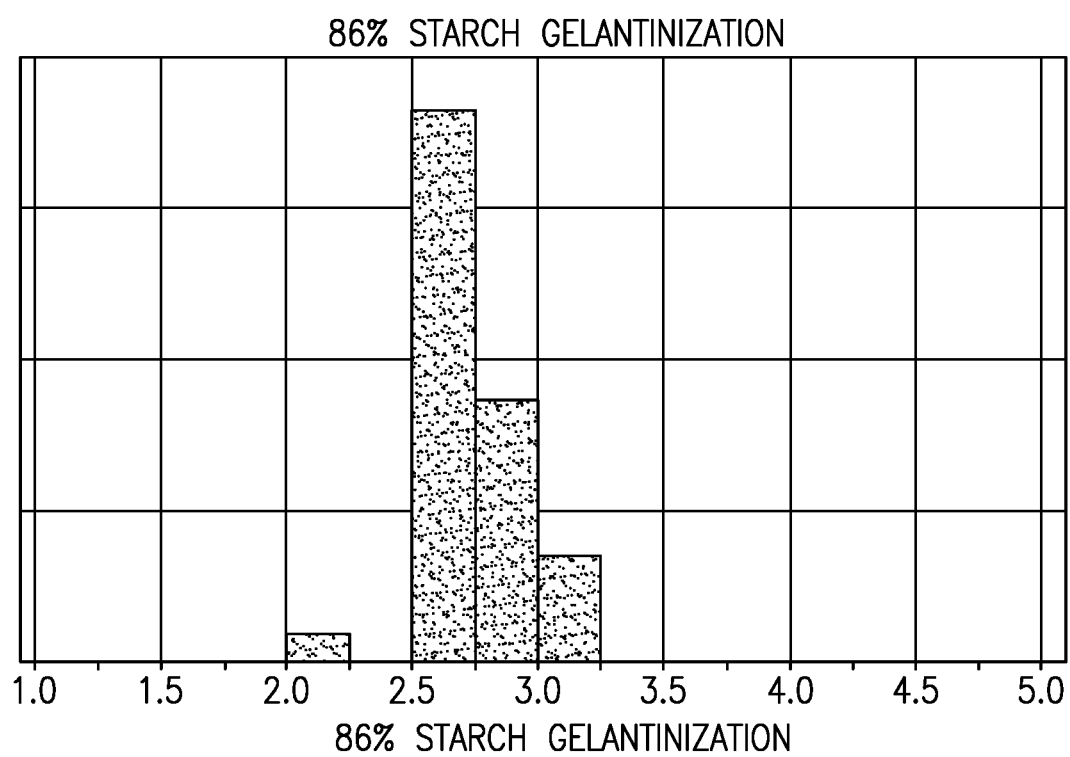
FIG. 6 depicts feces score distribution in diets with 86% starch gelatinization (Mean=2.61, SD=0.20).

It was observed that the diet with 81% starch gelatinization level resulted in more feces of loose stool quality ((see distribution in the stool score range 3-3.5 in Table 4 and FIG. 5); while the diet with 86% starch gelatinization level conforms to targeted stool quality (see distribution in the stool score range 2.5-2.75, and 2.75-3 in Table 4 and FIG. 6). This result supported that lower than 83% starch gelatinization level disrupts dogs stool quality. Therefore, maintaining starch gelatinization level is a factor that impacts stool quality.

TABLE 4

Fecal score frequency comparison-81% versus 86% gelatinization

| Feces Score | 81% starch gelatinization | 86% starch gelatinization |
| --- | --- | --- |
| 1 | 0 | 0 |
| 1.25 | 0 | 0 |
| 1.5 | 0 | 0 |
| 1.75 | 0 | 0 |
| 2 | 0 | 2 |
| 2.25 | 2 | 0 |
| 2.5 | 41 | 42 |
| 2.75 | 16 | 20 |
| 3 | 12 | 8 |
| 3.25 | 0 | 0 |
| 3.5 | 1 | 0 |
| 3.75 | 0 | 0 |
| 4 | 0 | 0 |
| 4.25 | 0 | 0 |
| 4.5 | 0 | 0 |
| 4.75 | 0 | 0 |
| 5 | 0 | 0 |

It should be understood that the invention is not limited to the particular embodiments described herein, but that various changes and modifications may be made without departing from the spirit and scope of this novel concept as defined by the following claims. Further, many other advantages of applicant's invention will be apparent to those skilled in the art from the above descriptions and the below claims.

What is claimed is:

1. A packaged pet food product, comprising:
    a first formulation having a first recipe and a first ratio of total dietary fiber to total fermentable fiber (first TDF:TFF ratio) between about 1.6:1 and about 12:1; and
    a second formulation having a second recipe and a second TDF:TFF ratio between about 1.6:1 and about 12:1;
    wherein the first recipe is different than the second recipe wherein the TDF:TFF ratios do not vary more than 4 times between the formulations;
    wherein the first formulation and the second formulation each include between about 25 wt % and about 70 wt % protein supplying ingredients, between about 30 wt % and about 70 wt % carbohydrate supplying ingredients, between about 1.5 wt % and about 12 wt % fats and oils, between about 4 wt % and about 12 wt % total dietary fiber, and between about 1 wt % and 2.5 wt % total fermentable fiber; and
    wherein the first formulation and the second formulation each include at least 40 wt % of ingredients that are unique when compared with each formulation in the packaged pet food product.

2. The packaged pet food product of claim 1, wherein the first formulation and the second formulation further comprise up to about 6 wt % of additives.

3. The packaged pet food product of claim 1, wherein the first formulation and the second formulation comprise level of starch gelatinization of at least 83%.

4. The packaged pet food product of claim 1, wherein the first formulation includes a first caloric density and the second formulation includes a second caloric density, and wherein the first caloric density has a value that is within 5% of a value of the second caloric density.

5. The packaged pet food product of claim 1, wherein:
    the first formulation is comprised of kibbles having a first shape,
    the second formulation is comprised of kibbles having a second shape, and
    the first shape is different than the second shape.

6. The packaged pet food product of claim 1, wherein the first TDF:TFF ratio and the second TDF:TFF ratio are each about 4:1.

* * * * *